US010640591B2

(12) United States Patent
Imura et al.

(10) Patent No.: US 10,640,591 B2
(45) Date of Patent: May 5, 2020

(54) METHOD FOR PRODUCING WATER-ABSORBENT RESIN

(71) Applicant: NIPPON SHOKUBAI CO., LTD., Osaka-shi, Osaka (JP)

(72) Inventors: Motohiro Imura, Himeji (JP); Shin-ichi Fujino, Himeji (JP); Ryota Wakabayashi, Himeji (JP); Kozo Nogi, Himeji (JP); Koji Honda, Himeji (JP); Yoshiki Katada, Himeji (JP); Kenji Kadonaga, Himeji (JP)

(73) Assignee: NIPPON SHOKUBAI CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/532,228

(22) PCT Filed: Dec. 3, 2015

(86) PCT No.: PCT/JP2015/084047
§ 371 (c)(1),
(2) Date: Jun. 1, 2017

(87) PCT Pub. No.: WO2016/088848
PCT Pub. Date: Jun. 9, 2016

(65) Prior Publication Data
US 2017/0267793 A1 Sep. 21, 2017

(30) Foreign Application Priority Data
Dec. 5, 2014 (JP) .................................. 2014-246914

(51) Int. Cl.
*C08F 120/06* (2006.01)
*C08F 2/14* (2006.01)
(Continued)

(52) U.S. Cl.
CPC ......... *C08F 120/06* (2013.01); *B01J 19/1812* (2013.01); *C08F 2/14* (2013.01);
(Continued)

(58) Field of Classification Search
CPC .......... C08F 2/14; C08F 20/26; C08F 120/06; C08F 220/26
See application file for complete search history.

(56) References Cited

U.S. PATENT DOCUMENTS 2,834,769 A * 5/1958 Feller ...................... C08F 10/00
502/325
4,446,261 A * 5/1984 Yamasaki ................. C08F 2/08
523/202

(Continued)

FOREIGN PATENT DOCUMENTS

CN      1253568 A     5/2000
CN      1688609 A    10/2005
(Continued)

OTHER PUBLICATIONS

Table C-1: Density of Liquids, Ludwig's Applied Process Design for Chemical and Petrochemical Plants, vol. 1, 4th Edition, Elsevier, 2007 (Year: 2007).*

*Primary Examiner* — Nicole M. Buie-Hatcher
(74) *Attorney, Agent, or Firm* — Dickinson Wright PLLC

(57) ABSTRACT

[Object] To provide a method for stably producing a water-absorbent resin in powder form or particle form, which has excellent physical properties such as water absorption performance and the like, without any production trouble.
[Solution] A method for producing a water-absorbent resin includes mixing a monomer composition, which contains at least a monomer and a pyrolytic polymerization initiator, with an organic solvent, a temperature of the organic solvent is not lower than 70° C. at time of mixing, and when a mass per unit time of the monomer in the monomer composition
(Continued)

to be mixed with the organic solvent is expressed as an amount per unit volume of the organic solvent, a lower limit is 0.01 g/ml/min, and an upper limit is 0.2 g/ml/min.

6 Claims, 1 Drawing Sheet

(51) Int. Cl.
  *C08L 33/02* (2006.01)
  *C08F 20/06* (2006.01)
  *B01J 19/18* (2006.01)
  *C08J 3/24* (2006.01)

(52) U.S. Cl.
  CPC ............. *C08F 20/06* (2013.01); *C08J 3/245* (2013.01); *C08L 33/02* (2013.01); *B01J 2219/24* (2013.01); *C08F 2810/20* (2013.01); *C08J 2333/02* (2013.01)

(56) References Cited

U.S. PATENT DOCUMENTS

| | | | | |
|---|---|---|---|---|
| 5,244,735 A | * | 9/1993 | Kimura | C08F 2/32 428/402 |
| 5,652,309 A | * | 7/1997 | Itoh | C08F 291/00 525/243 |
| 5,883,158 A | * | 3/1999 | Nambu | A61L 15/60 523/408 |
| 5,998,553 A | * | 12/1999 | Iida | C08F 2/32 526/193 |
| 2006/0282052 A1 | * | 12/2006 | Saito | A61L 15/60 604/372 |
| 2009/0036855 A1 | | 2/2009 | Wada et al. | |
| 2013/0123455 A1 | * | 5/2013 | Yokoyama | C08F 2/001 526/317.1 |

FOREIGN PATENT DOCUMENTS

| | | |
|---|---|---|
| EP | 0695762 A1 | 2/1996 |
| EP | 0977783 A1 | 2/2000 |
| EP | 1 418 000 A2 | 5/2004 |
| EP | 1543041 A1 | 6/2005 |
| EP | 2 623 198 A1 | 8/2013 |
| JP | 61-192703 A | 8/1986 |
| JP | 03-296502 A | 12/1991 |
| JP | 08-283318 A | 10/1996 |
| JP | 2002-284805 A | 10/2002 |
| JP | 2007-146078 A | 6/2007 |
| JP | 2010-095607 A | 4/2010 |
| JP | 2012-041419 A | 3/2012 |
| JP | 2014-014818 A | 1/2014 |
| WO | WO 94/20543 A1 | 9/1994 |

* cited by examiner

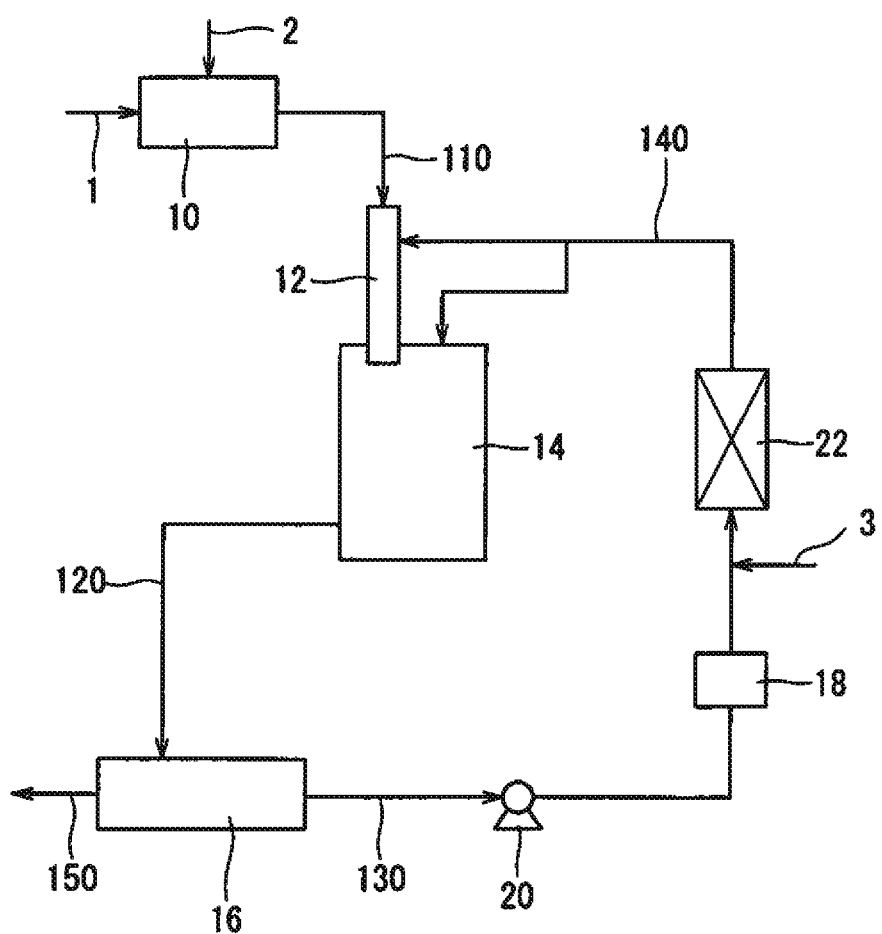

METHOD FOR PRODUCING WATER-ABSORBENT RESIN

TECHNICAL FIELD

The present invention relates to methods for producing a water-absorbent resin. More specifically, the present invention relates to methods for efficiently and stably producing a spherical water-absorbent resin having a controlled particle size distribution.

BACKGROUND ART

A water-absorbent resin (SAP/Super Absorbent Polymer) is a water-swellable and water-insoluble polymer gelling agent, and is frequently used in various fields of sanitary articles such as disposable diapers and sanitary napkins, water retention agents for agricultural and horticultural use, and water stopping materials for industrial use, and the like.

For the water-absorbent resin, many monomers and hydrophilic polymers are used as the raw materials thereof, and the most industrially produced is, from the viewpoint of water absorption performance, a polyacrylic acid (salt)-based water-absorbent resin in which acrylic acid and/or a salt thereof is used.

Due to improvement of performance of disposable diapers, which are a main application of the water-absorbent resin, the water-absorbent resin is required to have various functions (improved physical properties). Specifically, the water-absorbent resin is required to have various physical properties such as gel strength, water-soluble content, moisture content, water absorption speed, liquid permeability, particle size distribution, urine resistance, antibacterial property, damage resistance, powder fluidity, deodorization property, anti-coloring property, low dust, and low residual monomer, as well as water absorption capacity under no load and water absorption capacity under load which are basic physical properties.

Such a water-absorbent resin can be made into various forms such as sheet form, fiber form, film form, and the like, but are generally often made into powder form or particle form. Regarding a water-absorbent resin in powder form or particle form, it is known that the water absorption performance, the handleability, and the feeling in use vary depending on the particle diameter, the particle size distribution, or the like thereof. Thus, a water-absorbent resin in powder form or particle form which has an appropriately controlled particle diameter or particle size distribution is desired.

Examples of a main method for producing the water-absorbent resin in powder form or particle form include an aqueous solution polymerization method and a reverse phase suspension polymerization method. In the aqueous solution polymerization method, before or after drying, it is necessary to pulverize and classify a hydrous gel crosslinked polymer obtained in a polymerization step, so that the production process becomes complicated. Therefore, an advanced operating technique is necessary for stable operation.

Meanwhile, in the reverse phase suspension polymerization method, particle size control is possible at the stage of polymerization, and, for example, a method in which the ratio of a monomer relative to a hydrocarbon solvent is decreased and time is taken to drip the monomer (Patent Literature 1), a method in which a monomer aqueous solution is dripped to a hydrophobic organic solvent containing a specific phosphate-based dispersing agent (Patent Literature 2), a method in which polymerization is performed at multiple stages (Patent Literature 3), and a method in which upward flow of a dispersion medium solution is used by using a reaction device having a special shape (Patent Literature 4) have been proposed.

CITATION LIST

Patent Literature

Patent Literature 1: JP61-192703
Patent Literature 2: JP2002-284805
Patent Literature 3: JP2012-41419
Patent Literature 4: JP3-296502

SUMMARY OF THE INVENTION

Problems to be Solved by the Invention

As described above, in order to obtain a water-absorbent resin in powder form or particle form which has a controlled particle diameter or particle size distribution, techniques using the reverse phase suspension polymerization method have been considered and carried out hitherto. However, in any of the cases, in order to obtain a water-absorbent resin having a desired particle diameter or particle size distribution, dripping and a polymerization operation over a long period of time are necessary. In addition, in order to prevent particles from aggregating into a huge lump larger than necessary, it is necessary to add a large amount of a dispersing agent.

Specifically, in Patent Literature 1 and 2 described above, in order to control a particle diameter or a particle size distribution and remove the heat of reaction of polymerization, it is necessary to drip a monomer or the like to an organic solvent at a low flow rate over a long period of time, so that the productivity is low. In addition, in Patent Literature 3 described above, in order to obtain a water-absorbent resin having a desired particle diameter or particle size distribution, it is necessary to perform a polymerization operation several times, resulting in the polymerization time becoming long to cause a decrease in the productivity. Moreover, also in Patent Literature 4 described above, a special polymerization operation is needed, so that the polymerization time becomes long to cause a decrease in the productivity. Furthermore, in any of Patent Literature 1 to 4 described above, while the polymerization reaction continues, it is necessary to add a large amount of a dispersing agent in order to maintain a stable suspension state. As a result, a part of the dispersing agent remains in a water-absorbent resin obtained by the polymerization reaction, to excessively decrease surface tension, so that it is difficult to obtain a water-absorbent resin having desired water absorption performance.

As described above, a method for efficiently producing a water-absorbent resin in powder form or particle form, which has water absorption performance and the like demanded in the market, in a short time by using a conventional technique has not been proposed yet. Therefore, an object of the present invention is to provide a method for stably producing a water-absorbent resin in powder form or particle form, which has excellent physical properties such as water absorption performance and the like, without any production trouble.

Solution to the Problems

As a result of making various examinations for achieving the above object, the present inventors have found that the above object can be achieved by initiating at the same time a polymerization reaction of a monomer dispersed in an organic solvent in a short time, and inhibiting contact between monomer reactants having different polymerization ratios (e.g., droplets before particle formation after a polymerization reaction initiats, hydrous gel particles having a low polymerization ratio, etc.) and contact between unreacted monomers and hydrous gel particles having a low polymerization ratio.

That is, the present invention is a method for producing a water-absorbent resin comprising mixing a monomer composition, which contains at least a monomer and a pyrolytic polymerization initiator, with an organic solvent, wherein a temperature of the organic solvent is not lower than 70° C. at time of mixing, and wherein, when a mass per unit time of the monomer in the monomer composition that is mixed with the organic solvent is expressed as an amount per unit volume of the organic solvent, a lower limit is 0.01 g/ml/min and an upper limit is 0.2 g/ml/min. Unless otherwise specified, the volume of the organic solvent is the volume at 25° C. under 1 atm.

Advantageous Effects of the Invention

With the method for producing the water-absorbent resin according to the present invention, polymerization in a very short time is possible, so that use of a dispersing agent for the purpose of stabilizing a suspension state is not required, or the used amount of the dispersing agent can be reduced to such a small amount that the surface tension of the water-absorbent resin is not influenced. As a result, a water-absorbent resin having stable quality can be prepared efficiently in a short time. In the present specification, the dispersing agent means a substance having a function as an agent that stabilizes a suspension state.

BRIEF DESCRIPTION OF THE DRAWINGS

The FIGURE is a schematic diagram showing a part of a process for producing a water-absorbent resin according to an embodiment of the present invention.

DESCRIPTION OF EMBODIMENTS

The following will describe in detail the present invention. However, the scope of the present invention is not limited to the following description, and the present invention may be carried out by making modifications as appropriate without impairing the gist of the present invention, in addition to the following examples. Moreover, the present invention is not limited to the following embodiments, and various modifications may be made within the scope indicated by the claims. Another embodiment achieved by combining, as appropriate, each technical means disclosed in a plurality of embodiments is also included within the technical scope of the present invention.

[1] Definition of Terms (1-1) "Water-Absorbent Resin"

The term "water-absorbent resin" in the present invention refers to a water-swellable and water-insoluble polymer gelling agent that satisfies the following physical properties. That is, "water-absorbent resin" refers to a polymer gelling agent whose CRC (centrifuge retention capacity) defined by ERT441.2-02 as water swellability is not less than 5 g/g and whose Ext (water-soluble content) defined by ERT470.2-02 as water insolubility is not greater than 50% by mass.

The water-absorbent resin can be designed as appropriate in accordance with the application and/or purpose thereof, and is not particularly limited but is preferably a hydrophilic crosslinked polymer obtained by crosslinking and polymerizing an unsaturated monomer having a carboxyl group. In addition, the water-absorbent resin is not limited to a resin entirely composed of a crosslinked polymer, and may be a composition containing an additive and the like as long as each of the above physical properties (CRC, Ext) satisfies the above numerical range.

"Water-absorbent resin" in the present invention is not limited to a final product before shipment, and may refer to an intermediate in the production process for a water-absorbent resin (e.g., a hydrous gel crosslinked polymer after polymerization, water-absorbent resin powder before surface-crosslinking, etc.). All of them are collectively referred to as "water-absorbent resin".

(1-2) "Polyacrylic Acid (Salt)"

The term "polyacrylic acid (salt)" in the present invention refers to a polyacrylic acid and/or a salt thereof, and means a crosslinked polymer that contains a repeating unit of acrylic acid and/or a salt thereof (hereinafter referred to as "acrylic acid (salt)") as a main component and that contains a graft component as an optional component.

The term "main component" means that the used amount (contained amount) of the acrylic acid (salt) with respect to the entire monomer to be used in polymerization is preferably 50 to 100% by mole, more preferably 70 to 100% by mole, further preferably 90 to 100% by mole, and particularly preferably substantially 100% by mole.

The term "polyacrylic acid salt" as a crosslinked polymer includes a water-soluble salt of polyacrylic acid, and includes preferably a monovalent salt, more preferably an alkali metal salt or ammonium salt, further preferably an alkali metal salt, particularly preferably a sodium salt.

(1-3) "EDANA" and "ERT"

The term "EDANA" is an abbreviation for the European Disposables and Nonwovens Associations, and the term "ERT" is an abbreviation for EDANA Recommended Test Methods, which are European standard measuring methods for water-absorbent resin. In the present invention, unless otherwise specified, physical properties of the water-absorbent resin are measured according to the ERT original text (revised in 2002).

(a) "CRC" (ERT441.2-02)

The term "CRC" is an abbreviation for Centrifuge Retention Capacity, and means the water absorption capacity under no load (sometimes referred to as "water absorption capacity") of the water-absorbent resin. Specifically, CRC refers to a water absorption capacity (unit: g/g) measured after 0.2 g of the water-absorbent resin put in a nonwoven fabric is immersed in a large excess of a 0.9% by mass sodium chloride aqueous solution for 30 minutes to be freely swollen and then drained in a centrifuge (250 G) for 3 minutes.

(b) "AAP" (ERT442.2-02)

The term "AAP" is an abbreviation for Absorption Against Pressure, and means the water absorption capacity under load of the water-absorbent resin. Specifically, AAP refers to a water absorption capacity (unit: g/g) measured after 0.9 g of the water-absorbent resin is swollen in a large excess of a 0.9% by mass sodium chloride aqueous solution for 1 hour under a load of 2.06 kPa (21 g/cm$^2$, 0.3 psi). The water absorption capacity may be measured with the load condition changed to 4.83 kPa (49 g/cm$^2$, 0.7 psi). Although "Absorption Under Pressure" is described in ERT442.2-02, AAP is substantially the same as "Absorption Under Pressure".

(c) "Ext" (ERT470.2-02)

The term "Ext" is an abbreviation for Extractables, and means the water-soluble content (water-soluble component amount) of the water-absorbent resin. Specifically, Ext refers to the amount (unit: % by mass) of substances dissolved in 200 ml of a 0.9% by mass sodium chloride aqueous solution after 1.0 g of the water-absorbent resin is added to the aqueous solution and the aqueous solution is stirred at 500 rpm for 16 hours. For measuring the water-soluble content, pH titration is used.

(d) "Residual Monomers" (ERT410.2-02)

The term "Residual Monomers" means the amount of the monomer remaining in the water-absorbent resin. Hereinafter, the monomer remaining in the water-absorbent resin is referred to as "residual monomer". Specifically, the amount of the monomer refers to the amount (unit: ppm) of the monomer dissolved in 200 ml of a 0.9% by mass sodium chloride aqueous solution after 1.0 g of the water-absorbent resin is added to the aqueous solution and the aqueous solution is stirred at 500 rpm for 1 hour. For measuring the amount of the residual monomer, high-performance liquid chromatography (HPLC) is used.

(e) "Moisture Content" (ERT430.2-02)

The term "Moisture Content" means the moisture content of the water-absorbent resin. Specifically, the moisture content refers to a value (unit: % by mass) calculated from a drying loss when 4.0 g of the water-absorbent resin is dried at 105° C. for 3 hours. The moisture content may be measured with the amount of the water-absorbent resin changed to 1.0 g and with the drying temperature changed to 180° C.

(f) "PSD" (ERT420.2-02)

The term "PSD" is an abbreviation for Particle Size Distribution, and means the particle size distribution of the water-absorbent resin measured by sieve classification. A weight average particle diameter (D50) and the logarithmic standard deviation ($\sigma\zeta$) of the particle size distribution are measured by the same methods as in "(3) Mass-Average Particle Diameter (D50) and Logarithmic Standard Deviation ($\sigma\zeta$) of Particle Diameter Distribution" described in U.S. Pat. No. 7,638,570.

(1-4) "STY"

The term "STY" in the present invention is an abbreviation for Space Time Yield, and means the quantity of production per unit reaction volume per unit time. A specific calculation method for the STY will be described later.

(1-5) Others

In the present specification, "X to Y" indicating a range means "not less than X and not greater than Y". Unless otherwise noted, the mass unit "t (ton)" refers to "metric ton", and "ppm" refers to "ppm by weight" or "ppm by mass". Furthermore, "weight" and "mass", "part(s) by weight" and "part(s) by mass", and "% by weight" and "% by mass" are synonymous with each other. Moreover, " . . . acid (salt)" means " . . . acid and/or a salt thereof", and "(meth)acrylic" means "acrylic and/or methacrylic".

[2] Method for Producing Water-Absorbent Resin

The method for producing the water-absorbent resin according to the present invention includes: a mixing step of mixing a monomer aqueous solution, which contains a monomer that is a raw material of the water-absorbent resin, with a pyrolytic polymerization initiator to prepare a monomer composition; a supplying step of supplying the monomer composition to a reaction device, which an organic solvent has been put in; a polymerization step of initiating a polymerization reaction in the reaction device to obtain a hydrous gel crosslinked polymer; a separation step of separating the hydrous gel crosslinked polymer from the organic solvent; and other steps. Hereinafter, the hydrous gel crosslinked polymer may be referred to as "hydrous gel".

More specific embodiments of the method according to the present invention are generally classified into the following two embodiments.

<First Aspect>

The first aspect is a method in which a monomer composition containing at least a monomer and a polymerization initiator is dispersed in the form of droplets in an organic solvent in a short time, and at the same time, a polymerization reaction is initiated.

Examples of a method where a monomer composition is dispersed in the form of droplets in an organic solvent include: a method in which a reaction composition, which is a mixture of an organic solvent and a monomer composition, is prepared in advance and dispersed by stirring this reaction composition (hereinafter, referred to as a dispersion method); and a method in which a monomer composition is dispersed dropwise into an organic solvent that is being stirred (hereinafter, referred to as dripping method). As a method for initiating a polymerization reaction of a monomer on its dispersion state in an organic solvent, there are: a method of applying UV light, and a method of increasing a temperature of the organic solvent.

In the dispersion method, in order to initiate a polymerization reaction at the same time, for example, by applying UV light, it is necessary to evenly apply UV light to the entire organic solvent in which droplets formed with the monomer composition are dispersed. However, for the scale of production larger than a certain level, the design of a reaction vessel needs to be shallow and wide so that UV light can be applied entirely to a large amount of the organic solvent, which causes the size of a UV irradiation device to increase and therefore disadvantageous in terms of facility and cost. In addition, for example, in the case where a pyrolytic polymerization initiator is used as the polymerization initiator and a polymerization reaction is initiated by increasing the temperature of the organic solvent, it takes a certain amount of time to increase the temperature of the organic solvent, so that it is difficult to initiate the polymerization reaction at the same time. Since decomposition of the polymerization initiator has a probability distribution that depends on a temperature, decomposition at a low temperature cannot be fully inhibited; and since a heating surface has a temperature for heating that is higher than the temperature of the organic solvent, a polymerization reaction is initiated from a monomer that comes into contact with the heating surface.

On the other hand, in the first aspect of the present invention, the dropwise method is used. In the dropwise method, a pyrolytic polymerization initiator is used as the polymerization initiator, and the monomer is added dropwise to the organic solvent that is adjusted in advance to a temperature at which a polymerization reaction of the monomer can be initiated, whereby the polymerization reaction can be initiated at the same time. Furthermore, by shortening the dripping time, contact between monomer reactants having different polymerization ratios can be avoided, so that it is possible to avoid excessive use of a dispersing agent.

In the first aspect, the dripping time is selected as appropriate in accordance with reaction conditions such as the type of the pyrolytic polymerization initiator, the amount thereof, the total amount of the monomer to for dripping, the temperature of the organic solvent, and the like. From the viewpoint that a polymerization reaction is initiated at the same time and contact between the monomer reactants having different polymerization ratios is inhibited, the dripping time is preferably not longer than 180 seconds, more preferably not longer than 120 seconds, further preferably not longer than 90 seconds, and particularly preferably not longer than 75 seconds. A practically possible dripping time is preferably not shorter than 10 seconds, more preferably not shorter than 30 seconds, and particularly preferably not shorter than 45 seconds.

In the present invention, the mass of the monomer to be mixed with the organic solvent depends on a ratio thereof to the amount of the organic solvent. At a predetermined concentration, the temperature of the organic solvent is increased by heat of polymerization to efficiently advance the polymerization reaction, which is preferable. Specifically, when the mass per unit time of the monomer in the monomer composition that is mixed with the organic solvent is expressed as an amount per unit volume of the organic solvent, the lower limit thereof is 0.01 g/ml/min, preferably 0.02 g/ml/min, and more preferably 0.04 g/ml/min. In addition, the upper limit thereof is 0.2 g/ml/min, preferably 0.15 g/ml/min, and more preferably 0.12 g/ml/min. The above value exceeding the above range brings that the droplets containing the monomer and/or the monomer reactant become unified, a water-absorbent resin having a desired particle diameter cannot be obtained, and the influence of heat of polymerization becomes excessive in some cases, therefore that is not preferable. The mass of the monomer below the above range brings that the productivity decreases and also the polymerization time may become long, therefore that is not preferable.

The temperature of the organic solvent is selected as appropriate in accordance with the reaction conditions such as the type of the pyrolytic polymerization initiator, the amount thereof, the total amount of the monomer for dripping, and the like. From the viewpoint that a polymerization reaction is initiated at the same time, the temperature of the organic solvent is at least 70° C. Other more preferable reaction conditions are the same as those in a second aspect described later.

As described above, the first aspect of the present invention is a method for producing the water-absorbent resin, in which the monomer composition containing at least a monomer and a pyrolytic polymerization initiator is mixed dropwise with the organic solvent, which is adjusted to 70° C. or higher, within a dripping time of 180 seconds, such that when the mass per unit time of the monomer in the monomer composition that is mixed with the organic solvent is expressed as an amount per unit volume of the organic solvent, the lower limit thereof is 0.01 g/ml/min and the upper limit thereof is 0.2 g/ml/min.

<Second Aspect>

The second aspect of the present invention is a method in which a monomer composition containing at least a monomer and a polymerization initiator is supplied continuously to be mixed with the organic solvent that moves within a reaction portion of the reaction device. In the second aspect, since the monomer composition is supplied into the organic solvent moving within the reaction portion, droplets formed by the monomer composition move together with the organic solvent without being retained. Thus, contact between monomer reactants having different polymerization ratios is inhibited.

Also in the second aspect, examples of the method for initiating a polymerization reaction of the monomer on its dispesion state in the organic solvent include a method of applying UV light and a method of increasing the temperature of the organic solvent. Similarly to the first aspect, in order to initiate a polymerization reaction at the same time by the method of applying UV light, it is necessary to evenly apply UV light to the entire organic solvent. Thus, the shape of the reaction vessel is limited, and a very large UV irradiation device is needed, so that the method of applying UV light is not suitable for practical use. As described above in the first aspect, in the second aspect of the present invention, a method is used in which a pyrolytic polymerization initiator is used as the polymerization initiator and the temperature of the organic solvent is increased to a predetermined temperature or higher.

The temperature of the organic solvent is selected as appropriate in accordance with the reaction conditions such as the type of the pyrolytic polymerization initiator, the amount thereof, the mass of the monomer in the monomer composition, and the like. From the viewpoint that a polymerization reaction is initiated at the same time, the temperature of the organic solvent is at least 70° C.

In the case where a pyrolytic polymerization initiator is used as the polymerization initiator, there is a method in which, for example, after the monomer composition is supplied to mix with the organic solvent, the entire organic solvent, in which droplets formed with the monomer composition are dispersed, is heated to increase the temperature thereof, such that a polymerization reaction is initiated. However, in this method, it takes time until the temperature of the entire organic solvent is increased to a predetermined temperature or higher, and also the state of polymerization becomes ununiform due to the temperature difference between the heating surface and the interior of the organic solvent. Thus, this method is not preferable.

On the other hand, in the second aspect of the present invention, a method is used in which adjustment is performed such that the temperature of the organic solvent containing the monomer composition (i.e., reaction composition) is a predetermined temperature or higher at the time point at which the monomer composition is supplied to the organic solvent. Examples of this method include: a method in which the monomer composition or a mixture containing the organic solvent and the monomer composition is supplied into the organic solvent that is adjusted in advance to a predetermined temperature or higher; and a method in which heat of neutralization of the monomer by addition of a neutralizer such as a basic substance or the like is used. More specific examples of the method in which heat of neutralization by the basic substance is used include: a method of adding the basic substance to the monomer composition immediately before the monomer composition is supplied to the organic solvent; and a method of simultaneously supplying the monomer composition and the basic substance to the organic solvent.

In the second aspect, the method for supplying the monomer composition is not particularly limited as long as a water-absorbent resin having a desired particle diameter is obtained. Specific examples thereof include: a method in which adjustment is performed in advance and dripping is performed such that droplets formed by the monomer composition each have a desired size; and a method in which the sizes of the obtained droplets are controlled by adjusting the moving speed (flow rate) of the organic solvent in the reaction device and the supplied amount of the monomer composition.

In the second aspect, the mass of the monomer to be supplied to the organic solvent is preferably within a predetermined range, since the temperature of the organic solvent is increased by heat of polymerization to efficiently advance the polymerization reaction. In addition, in the second aspect, when the mass per unit time of the monomer in the monomer composition that is mixed with the organic solvent is expressed as an amount per unit volume of the organic solvent, since a mixture of the monomer composition and the organic solvent can be regarded as a continuum of formed microbodies, the ratio of the monomer flow rate (a monomer composition flow rate (mass/time)×monomer concentration (% by mass)) per the organic solvent flow rate (volume/time) is a ratio that is a monomer flow rate/an organic solvent flow rate. Therefore, in the reaction portion, the lower limit of the ratio that is the monomer flow rate/the organic solvent flow rate is preferably 0.01 g/ml, more preferably, 0.02 g/ml, and further preferably 0.04 g/ml. In addition, the upper limit thereof is selected as appropriate on the basis of the dispersion state of the droplets formed by the monomer composition, but is preferably 0.2 g/ml, more preferably 0.15 g/ml, further preferably 0.12 g/ml, particularly preferably 0.10 g/ml, and most preferably 0.07 g/ml. The ratio that is the monomer flow rate/the organic solvent flow rate exceeding the above range brings that the droplets containing the monomer and/or the monomer reactant become unified, a water-absorbent resin having a desired particle diameter cannot be obtained, and the influence of heat of polymerization becomes excessive in some cases, therefore that is not preferable. The mass of the monomer below the above range brings that the productivity decreases and also the polymerization time may become long, therefore that is not preferable.

In the second aspect, it is also possible to carry out a batchwise production method, but a continuous production method is preferably used from the viewpoint of production efficiency. The continuous production method is a method in which the monomer composition is continuously supplied to the organic solvent stored in the reaction portion of the reaction device, and a hydrous gel crosslinked polymer (hereinafter, also referred to as hydrous gel), which is formed by a polymerization reaction, and the organic solvent are continuously discharged from the reaction device. In a more preferable method, at least a part of the organic solvent discharged from the reaction device is collected in a separating step described later, resupplied to the reaction device, and reused therein. Other more preferable reaction conditions will be described later.

As described above, the second aspect of the present invention is a method for producing the water-absorbent resin, in which the monomer composition containing at least the monomer and the pyrolytic polymerization initiator is supplied continuously to mix with the organic solvent that is stored in the reaction portion of the reaction device and is moving within the reaction device, the temperature of the reaction composition obtained after mixing is not lower than 70° C., and adjustment is performed such that the lower limit of the ratio that is the monomer flow rate/the organic solvent flow rate, which is expressed as the ratio of the monomer flow rate (the monomer composition flow rate (mass/time)× monomer concentration (% by mass)) per the organic solvent flow rate in the reaction portion (volume/time), is 0.01 g/ml; and the upper limit thereof is 0.2 g/ml.

Example of Specific Embodiment of Second Aspect

The FIGURE shows a part (the mixing step to the separating step) of a production process for the water-absorbent resin regarding an example of a specific embodiment of the second aspect. As shown in the FIGURE, the production process includes a mixing device 10, a supply device 12, a reaction device 14, a separation device 16, a purification device 18, a heat exchanger 22, a liquid-feeding pump 20, and lines 110, 120, 130, 140, and 150 which connect between these devices. The following will describe an outline of a production method according to the example of this embodiment with reference to the FIGURE.

First, the interiors of the reaction device 14, the separation device 16, the purification device 18, and the heat exchanger 22 and the interiors of the lines 120, 130, and 140 which connect these devices are filled with the organic solvent, and the liquid-feeding pump 20 is activated to circulate the organic solvent therethrough. The organic solvent filled in the respective devices and lines is heated to a predetermined temperature by the heat exchanger 22. A part of the organic solvent heated by the heat exchanger 22 is also supplied to the supply device 12.

Next, the monomer aqueous solution and the pyrolytic polymerization initiator which are separately prepared are individually and continuously supplied to the mixing device 10 and mixed with each other to prepare a monomer composition. Thereafter, the monomer composition is continuously supplied to the supply device 12 through the line 110. The monomer composition is continuously put into the organic solvent in the reaction device 14 in the form of droplets by the supply device 12, and a polymerization reaction is initiated in the reaction device 14. In the reaction device 14, because of the movement of the circulated organic solvent, the droplets formed with the monomer composition move. The droplets turn into a hydrous gel crosslinked polymer by the polymerization reaction while moving. The moving direction of the droplets and the hydrous gel is the same as the moving direction of the organic solvent (parallel flow).

Subsequently, the hydrous gel crosslinked polymer obtained by the polymerization reaction is continuously discharged from the reaction device 14 together with the organic solvent, and continuously supplied to the separation device 16 through the line 120. In the separation device 16, the hydrous gel crosslinked polymer and the organic solvent are continuously separated from each other. The separated hydrous gel crosslinked polymer is continuously supplied to the next step. The separated organic solvent is continuously resupplied to the reaction device 14 through the lines 130 and 140 via the purification device 18 and the heat exchanger 22. A part of the separated organic solvent is also supplied to the supply device 12 via the heat exchanger 22. In this described embodiment, continuous production is adopted. In this case, each operation in each step and between the steps can be continuously executed, so that it is possible to avoid trouble such as a blockage caused by stop and restart of each device.

(2-1) Mixing Step

This step is a step of mixing an aqueous solution, which contains, as a main component, a monomer that is a raw material of the water-absorbent resin (hereinafter, referred to as "monomer aqueous solution"), with a pyrolytic polymerization initiator to prepare a monomer composition. In the specification of the present application, the "monomer composition" means a composition that contains a monomer and a pyrolytic polymerization initiator described later, as essential components, and that contains additives such as water, an organic solvent, an internal crosslinking agent, and the like according to need. Among them, a composition that contains a monomer and a pyrolytic polymerization initiator as essential components and that contains additives (note that additives having compatibility with the monomer) such as water, an internal crosslinking agent, and the like, is defined as a "monomer composition in a narrow sense". Preferably, the "monomer composition in a narrow sense" contains a monomer, a polymerization initiator, water, a neutralizer, and an internal crosslinking agent as essential components.

(Monomer)

In the method for producing the water-absorbent resin according to the present invention, the monomer to be used only needs to be a compound that can be polymerized into a water-absorbent resin, and the type of the monomer is not particularly limited, but examples of the monomer include: acid group-containing monomers such as (meth)acrylic acid, maleic acid (anhydride), itaconic acid, cinnamic acid, vinylsulfonic acid, allyltoluene sulfonic acid, vinyltoluene sulfonic acid, styrene sulfonic acid, 2-(meth)acrylamide-2-methylpropane sulfonic acid, 2-(meth)acryloylethane sulfonic acid, 2-(meth)acryloylpropane sulfonic acid, and 2-hydroxyethyl(meth)acryloyl phosphate; amide group-containing unsaturated monomers such as (meth)acrylamide, N-ethyl (meth)acrylamide, and N,N-dimethyl (meth)acrylamide; amino group-containing unsaturated monomers such as N,N-dimethylaminoethyl(meth)acrylate, N,N-dimethylaminopropyl(meth)acrylate, and N,N-dimethylaminopropyl (meth)acrylamide; mercapto group-containing unsaturated monomers; phenolic hydroxyl group-containing unsaturated monomers; and the like.

Among the monomers to be used in the present invention, when an acid group-containing monomer having an acid group such as a carboxyl group is used, a neutralized salt obtained by neutralizing the acid group can be used. In this case, a salt of the acid group-containing monomer is preferably a salt with monovalent cation, more preferably at least one salt selected from an alkali metal salt, an ammonium salt, and an amine salt, further preferably an alkali metal salt, even further preferably at least one salt selected from a sodium salt, a lithium salt, and a potassium salt, and particularly preferably a sodium salt.

Among them, from the viewpoint of the water absorption performance of the obtained water-absorbent resin, an acid group-containing monomer and/or a salt thereof is preferable, (meth)acrylic acid (salt), maleic acid (anhydride) (salt), itaconic acid (salt), and cinnamic acid (salt) are more preferable, and acrylic acid (salt) is particularly preferable.

In the present invention, when an acid group-containing monomer is used, a neutralized salt of the acid group-containing monomer is preferably used in combination from the viewpoint of the water absorption performance of the obtained water-absorbent resin. From the viewpoint of water absorption performance, the number of moles of the neutralized salt relative to the total number of moles of the acid group-containing monomer and the neutralized salt thereof (hereinafter, sometimes referred to as neutralization ratio) is preferably not less than 50% by mole, more preferably in the range of 50 to 80% by mole, further preferably in the range of 55 to 78% by mole, and particularly preferably in the range of 60 to 75% by mole. Unless otherwise specified, the monomer in the present invention is a concept including a neutralized salt thereof.

Examples of a method for adjusting the neutralization ratio include: a method in which the acid group-containing monomer and the neutralized salt thereof are mixed with each other; a method in which a publicly known neutralizer is added to the acid group-containing monomer; a method in which a partially neutralized salt of the acid group-containing monomer that is adjusted in advance to a predetermined neutralization ratio (i.e., a mixture of the acid group-containing monomer and the neutralized salt thereof) is used; and the like. In addition, these methods may be combined.

The neutralizer to be used for neutralizing the acid group-containing monomer is not particularly limited, but an inorganic salt such as sodium hydroxide, potassium hydroxide, sodium carbonate, and ammonium carbonate, a basic substance such as an amine-based organic compound having an amino group or an imino group, or the like is selected as appropriate and used as the neutralizer. As the neutralizer, two or more basic substances may be used in combination.

The adjustment of the neutralization ratio may be performed before initiate of a polymerization reaction of the acid group-containing monomer, may be performed during crosslinking/polymerization reactions of the acid group-containing monomer, or may be performed on a hydrous gel crosslinked polymer obtained after end of the crosslinking/polymerization reactions of the acid group-containing monomer. In addition, the neutralization ratio may be adjusted at any one stage selected from among: before initiation of the polymerization reaction; during the polymerization reaction; and after end of the polymerization reaction, or the neutralization ratio may be adjusted at a plurality of stages among them. In application to sanitary articles such as disposable diapers and the like in which there is a possibility of direct contact with a human body, the neutralization ratio is adjusted preferably before initiation of the polymerization reaction and/or during the polymerization reaction, and more preferably before initiation of the polymerization reaction.

In the method according to the present invention, any of the monomers described above as examples may be used solely, or any two or more of the monomers may be mixed as appropriate and used. In addition, another monomer may be further mixed as long as the object of the present invention is achieved.

When two or more of the monomers are used in combination, acrylic acid (salt) is preferably contained as a main component. In this case, from the viewpoint of the water absorption performance of the obtained water-absorbent resin, the proportion of the acrylic acid (salt) to the entire monomer is normally not less than 50% by mole, preferably not less than 70% by mole, more preferably not less than 80% by mole, and further preferably not less than 90% by mole (the upper limit is 100% by mole).

(Pyrolytic Polymerization Initiator)

In the method for the water-absorbent resin according to the present invention, a pyrolytic polymerization initiator is used. The pyrolytic polymerization initiator refers to a compound that is decomposed by heat to generate radicals. From the viewpoint of storage stability and production efficiency, the pyrolytic polymerization initiator is a water-soluble compound having a 10-hour half-life temperature (hereinafter, referred to as T10) of preferably 0 to 120° C., more preferably 30 to 100° C., and further preferably 50 to 80° C.

Specific examples of the pyrolytic polymerization initiator include: persulfates such as sodium persulfate, potassium persulfate, and ammonium persulfate; azo compounds such as 2,2'-azobis(2-methylpropionamidine)dihydrochloride, 2,2'-azobis(2-amidinopropane)dihydrochloride, 2,2'-azobis[2-(2-imidazoline-2-yl)propane]dihydrochloride, and 2,2'-azobis(2-methylpropionitrile); peroxides such as hydrogen peroxide, t-butyl peroxide, and methyl ethyl ketone peroxide; and the like. Two or more of them may be used in combination.

From the viewpoint of the handleability of the polymerization initiator and the physical properties of the water-absorbent resin, persulfates are preferably used, sodium persulfate, potassium persulfate, and ammonium persulfate are more preferably used, and sodium persulfate is further preferably used.

The used amount of the pyrolytic polymerization initiator is set as appropriate in accordance with the types of the monomer and the polymerization initiator and the like, and is not particularly limited. However, from the viewpoint of production efficiency, the used amount of the pyrolytic polymerization initiator with respect to the monomer is preferably not less than 0.001 g/mol, more preferably not less than 0.005 g/mol, and further preferably not less than 0.01 g/mol. In addition, from the viewpoint of improvement of the water absorption performance of the water-absorbent resin, the used amount of the pyrolytic polymerization initiator is preferably not greater than 2 g/mol and more preferably not greater than 1 g/mol.

In addition, according to need, the pyrolytic polymerization initiator can be used in combination with another polymerization initiator such as a photolytic polymerization initiator. Specific examples of the photolytic polymerization initiator include benzoin derivatives, benzyl derivatives, acetophenone derivatives, benzophenone derivatives, and the like.

When the pyrolytic polymerization initiator and another polymerization initiator are used in combination, the proportion of the pyrolytic polymerization initiator to the entire polymerization initiator is preferably not less than 60% by mole and more preferably not less than 80% by mole.

In addition, the pyrolytic polymerization initiator and a reducing agent can be used in combination as a redox polymerization initiator. In the redox polymerization initiator, the pyrolytic polymerization initiator serves as an oxidizing agent. The reducing agent to be used is not particularly limited, but examples of the reducing agent include: (bi)sulfites such as sodium sulfite and sodium hydrogen sulfite; reducing metal salts such as ferrous salts; L-ascorbic acid (salt); amines; and the like.

(Solvent)

In the method for producing the water-absorbent resin according to the present invention, the monomer composition preferably contains at least a monomer and a pyrolytic polymerization initiator, and further contains a solvent. The solvent to be used is preferably water and/or an organic solvent, more preferably a solvent containing at least water, and particularly preferably water.

A method for obtaining the monomer composition containing the solvent is not particularly limited. Examples of the method include: a method in which the solvent is added to the monomer composition prepared in the mixing step; a method in which the solvent is added as a solvent for diluting or dissolving the monomer, the polymerization initiator, the neutralizer, and an internal crosslinking agent and other additives described later; and a method in which these methods are used in combination.

(Internal Crosslinking Agent)

In the method for producing the water-absorbent resin according to the present invention, an internal crosslinking agent is preferably used. By the internal crosslinking agent, the water absorption performance of the obtained water-absorbent resin, the gel strength thereof at the time of water absorption, and the like are adjusted.

The internal crosslinking agent only needs to have two or more unsaturated bonds or reactive functional groups within one molecule thereof, and the type of the internal crosslinking agent is not particularly limited, but examples of the internal crosslinking agent include N,N-methylene bis (meth)acrylamide, (poly)ethylene glycol di(meth)acrylate, (poly)propylene glycol di(meth)acrylate, trimethylol propane tri(meth)acrylate, glycerin (meth)acrylate, glycerin acrylate methacrylate, ethylene oxide-modified trimethylol propane tri(meth)acrylate, pentaerythritol hexa(meth)acrylate, triallyl cyanurate, triallyl isocyanurate, triallyl phosphate, triallylamine, polyallyloxy alkane, (poly)ethylene glycol diglycidyl ether, glycerol diglycidyl ether, ethylene glycol, polyethylene glycol, propylene glycol, glycerin, 1,4-butanediol, pentaerythritol, ethylenediamine, ethylene carbonate, propylene carbonate, polyethyleneimine, glycidyl (meth)acrylate, and the like. Two or more of them may be used in combination.

The used amount of the internal crosslinking agent is set as appropriate in accordance with the types of the monomer and the internal crosslinking agent and the like, and is not particularly limited. However, from the viewpoint of the gel strength of the obtained water-absorbent resin, the used amount of the internal crosslinking agent with respect to the monomer is preferably not less than 0.001% by mole, more preferably not less than 0.005% by mole, and further preferably not less than 0.01% by mole. In addition, from the viewpoint of improvement of the water absorption performance of the water-absorbent resin, the used amount of the internal crosslinking agent is preferably not greater than 5% by mole and more preferably not greater than 2% by mole. In a polymerization condition in which a self-crosslinking reaction of the monomer is effective, the internal crosslinking agent may not be used.

(Others, Materials to be Added to Monomer Composition)

In the method for producing the water-absorbent resin according to the present invention, a substance (hereinafter, referred to as "additive") whose examples will be described below can be added to the monomer composition as long as the object of the present invention is achieved.

Specific examples of the additives include: chain transfer agents such as thiols, thiolic acids, secondary alcohols, amines, and hypophosphites; foaming agents such as carbonates, bicarbonates, azo compounds, and bubbles; chelating agents such as metal salts of ethylenediamine tetraacetic acid, and metal salts of diethylenetriamine pentaacetic acid; hydrophilic polymers such as polyacrylic acid (salt) and crosslinked products thereof, starch, cellulose, starch-cellulose derivatives, and polyvinyl alcohol; and the like. These additives may be used solely, or two or more of these additives may be used in combination.

The used amount of the additives is not particularly limited, but is preferably not greater than 10% by mass as the total additive concentration in the monomer composition.

(Method for Producing Monomer Composition)

The method for producing the monomer composition can include operations described below as examples, according to need.

(2-1-1) Preparation Operation for Monomer Preparation

In the specification of the present application, a monomer preparation is defined as containing the above-described monomer as an essential component and not containing a pyrolytic polymerization initiator. The monomer preparation can contain a neutralizer, a solvent, an additive preparation described later, and the like, according to need. The preparation operation for the monomer preparation includes operations such as mixing two or more monomers, mixing the neutralizer and the solvent, mixing an acid group-containing monomer and the neutralizer, mixing the monomer and the solvent, and mixing with the additive preparation, and the like, according to need. These operations may be combined as appropriate.

(2-1-2) Preparation Operation for Pyrolytic Polymerization Initiator Preparation In the specification of the present application, a pyrolytic polymerization initiator preparation is defined as containing the above-described pyrolytic polymerization initiator as an essential component and not containing a monomer. The pyrolytic polymerization initiator preparation can contain a solvent, the additive preparation described later, and the like according to need. The preparation operation for the pyrolytic polymerization initiator preparation includes operations such as mixing two or more polymerization initiators including one or more pyrolytic polymerization initiators, mixing the pyrolytic polymerization initiator and the solvent, mixing with the additive preparation described later, and the like. These operations may be combined as appropriate.

(2-1-3) Preparation Operation for Additive Preparation

In the specification of the present application, the additive preparation means a preparation containing a substance other than the above-described monomer and polymerization initiator. Therefore, the preparation operation for the additive preparation can include operations such as mixing an internal crosslinking agent and a solvent, mixing the internal crosslinking agent and another additive, mixing the other additive and the solvent, mixing the internal crosslinking agent, the other additive and the solvent, and the like, according to need. The preparation operation for the additive preparation may be performed as an independent operation, or may be performed together with the preparation operations for the monomer preparation and the pyrolytic polymerization initiator preparation.

(2-1-4) Mixing Operation for Monomer and Pyrolytic Polymerization Initiator

For producing the monomer composition containing at least the monomer and the pyrolytic polymerization initiator, a mixing operation of mixing at least the monomer and/or monomer preparation and the pyrolytic polymerization initiator and/or pyrolytic polymerization initiator preparation, is performed. The mixing operation can include operations such as mixing with the additive preparation, mixing with the solvent, and the like according to need.

(2-1-5) Solvent Adding Operation

According to need, an operation of adding the solvent may be performed after the mixing operation of mixing the monomer and the pyrolytic polymerization initiator (2-1-4).

(2-1-6) Degassing Operation

According to need, a degassing operation is performed as appropriate on the raw materials to be used in the method according to the present invention such as the monomer, the polymerization initiator, the solvent, and the like. Examples of the degassing operation include distillation of the solvent, substitution with inert gas such as nitrogen, and the like. The operation of substitution with inert gas may be performed one or more times between the respective operations of (2-1-1) to (2-1-5) described above or during each of the operations, or may be performed after the operations of (2-1-4) and (2-1-5) described above, or a combination of these operations may be performed a plurality of times.

Description of Specific Embodiments of Mixing Step

The following will describe specific embodiments of the mixing step, but the mixing step is not limited thereto.

Specific Embodiment 1 of Mixing Step

Initially, the above-described neutralizer and solvent are mixed to prepare a neutralizer solution. Subsequently, the neutralizer solution, the acid group-containing monomer, and the solvent are mixed, then the additive is further mixed, and substitution with inert gas is performed, thereby preparing a monomer preparation. Separately, the pyrolytic polymerization initiator and the solvent are mixed, and substitution with inert gas is performed, thereby preparing a pyrolytic polymerization initiator preparation. Finally, the monomer preparation and the pyrolytic polymerization initiator preparation are mixed to prepare a monomer composition.

Specific Embodiment 2 of Mixing Step

The above-described acid group-containing monomer and additive are mixed, and then substitution with inert gas is performed, to prepare an acid group-containing monomer preparation. Separately, the neutralizer and the solvent are mixed, and then substitution with inert gas is performed, to prepare a neutralizer solution. Further, separately, the pyrolytic polymerization initiator and the solvent are mixed, and then substitution with inert gas is performed, to prepare a pyrolytic polymerization initiator preparation. Moreover, separately, substitution with inert gas is performed on the solvent, to prepare a degassed solvent. Finally, the acid group-containing monomer preparation, the neutralizer solution, the pyrolytic polymerization initiator preparation, and the degassed solvent are mixed simultaneously to prepare a monomer composition.

Furthermore, other embodiments in the production process shown in the FIGURE include: (1) a method in which a monomer aqueous solution that is prepared in advance, and an aqueous solution containing the pyrolytic polymerization initiator (hereinafter, referred to as "polymerization initiator aqueous solution") are supplied simultaneously to the mixing device 10 through different pipes and mixed therein; (2) a method in which a monomer aqueous solution that is prepared in advance is supplied to the mixing device 10, and then the pyrolytic polymerization initiator is supplied to mix therewith; (3) a method in which a monomer aqueous solution that is prepared in advance is supplied to the mixing device 10, and then an polymerization initiator aqueous solution that is prepared in advance is supplied to mix therewith; and the like.

The mixing device 10 is not particularly limited, but examples of the mixing device 10 include a line mixer, a tank, and the like. From the viewpoint of the storage stability and the safety of the pyrolytic polymerization initiator, the above method (1) for mixing, in which a line mixer is used as the mixing device 10, is preferable.

(Monomer Concentration in Monomer Composition)

From the viewpoint of the physical properties and the productivity of the water-absorbent resin, the monomer concentration in the monomer composition is preferably 10 to 90% by mass, more preferably 20 to 80% by mass, and further preferably 30 to 70% by mass. Further, the monomer concentration in the monomer composition in a narrow sense is preferably 10 to 90% by mass, more preferably 20 to 80% by mass, and further preferably 30 to 70% by mass. Hereinafter, the monomer concentration in the monomer composition in a narrow sense is sometimes referred to as "monomer concentration".

(Temperature of Monomer Composition)

When the monomer composition obtained in the above mixing step is the monomer composition in a narrow sense, the temperature (hereinafter, referred to as "Tm") of the monomer composition is preferably kept at least at a temperature not exceeding 70° C. until the monomer composition is put into the organic solvent in a supplying step described later. However, when the lowest 10-hour half-life temperature T10 in the pyrolytic polymerization initiator contained in the monomer composition is lower than 70° C., the temperature Tm of the monomer composition is preferably kept at a temperature lower than the temperature T10. When the 10-hour half-life temperature of the pyrolytic polymerization initiator is unknown, the temperature T10 is assumed as 70° C., and the temperature at which the monomer composition is kept is set.

From the viewpoint of the storage stability of the monomer composition and avoidance of production trouble, the difference $\Delta T1$ (=T10−Tm) between the temperature Tm and the temperature T10 is preferably not lower than 10° C., more preferably not lower than 15° C., and further preferably not lower than 20° C. The upper limit thereof is preferably not higher than 50° C., from the viewpoint of cost.

When the monomer composition prepared in the mixing step contains an organic solvent described later and has never reached a temperature equal to or higher than the above T10, the temperature Tm of the monomer composition is preferably set such that the above-described condition is satisfied. On the other hand, when the monomer composition contains the organic solvent described later, and the temperature Tm is equal to or higher than T10 at the time point at which the monomer composition is prepared, the monomer composition is preferably subjected to a supplying step immediately.

(2-2) Supplying Step

This step is a step of supplying the monomer composition obtained in the above mixing step, to the reaction device 14.

(Supply Device)

The supply device 12 to be used in this step is not particularly limited, but preferably has a function to disperse the monomer composition in a narrow sense in the organic solvent described later in the form of droplets. As such a supply device 12, for example, a device can be used in which a liquid column or a liquid film of the monomer composition is discharged from one or two or more orifices or nozzles, and is broken up in the organic solvent to generate droplets. Specifically, examples of the supply device 12 include: cylindrical nozzles such as needles; an orifice plate obtained by providing multiple holes directly in a plate; one-fluid sprays such as a swirl injection valve, a fine spray nozzle, and a collision type injection valve; two-fluid sprays; centrifugal atomizers such as a rotary wheel; and the like.

In the present invention, from the viewpoint of the stability of a dispersion or suspension state and the heat transfer efficiency of the organic solvent, the volume average particle diameter of the droplets formed by the monomer composition is preferably not greater than 2000 μm, more preferably not greater than 1000 μm, and further preferably not greater than 800 μm. In addition, from the viewpoint of production efficiency, the volume average particle diameter is preferably not less than 10 μm, more preferably not less than 50 μm, and further preferably not less than 100 μm.

The "volume average particle diameter" of the droplets can be calculated by using a calculation method according to "Particle size analysis-Laser diffraction methods" specified in JIS Z 8825 or "Representation of results of particle size analysis—Part 2: Calculation of average particle sizes/diameters and moments from particle size distributions" specified in JIS Z 8819-2, or by using a calculation method by image analysis of a picture obtained by photographing a dispersion state.

(Retention Time)

From the viewpoint of avoidance of production trouble such as a blockage of a pipe, the time until the monomer composition prepared in the above mixing step is put into the reaction device 14 (hereinafter, referred to as "retention time") is preferably not longer than 1 minute, preferably not longer than 45 seconds, and further preferably not longer than 20 seconds. Ideally, the monomer composition is put into the reaction device 14 immediately after the monomer composition is prepared.

(2-3) Polymerization Step

This step is a step of polymerizing the monomer composition supplied to the reaction device 14 by the above supplying step, to obtain a hydrous gel crosslinked polymer.

(Organic Solvent)

The organic solvent to be used in the method for producing the water-absorbent resin according to the present invention refers to an organic compound that does not mutually dissolve with the monomer composition in a narrow sense, that is, has low compatibility with the monomer composition in a narrow sense and that is essentially hydrophobic. In addition, the organic solvent is essentially inactive against a polymerization reaction of the monomer that is the raw material of the water-absorbent resin of the present invention.

Specific examples of the organic solvent include: aliphatic hydrocarbons such as n-pentane, n-hexane, n-heptane, and n-octane; alicyclic hydrocarbons such as cyclohexane, methylcyclohexane, cyclooctane, and decalin; aromatic hydrocarbons such as benzene, toluene, and xylene; halogenated hydrocarbons such as chlorobenzene, bromobenzene, carbon tetrachloride, and 1,2-dichloroethane; and the like. From the viewpoint of easy availability and quality stability of the organic solvent and the like, n-hexane, n-heptane, and cyclohexane are preferably used.

(Specific Gravity Adjuster)

In the method for producing the water-absorbent resin according to the present invention, a specific gravity adjuster is preferably blended in the organic solvent. By the specific gravity adjuster, the polymerization time of the present invention is adjusted.

The specific gravity adjuster may be any adjuster as long as the adjuster has high compatibility with the organic solvent and does not inhibit the polymerization reaction, and the type of the specific gravity adjuster is not particularly limited, but examples thereof include chlorine-based or fluorine-based compounds such as hydrofluorocarbon, hydrofluoroether, hydrochlorofluorocarbon, and fluorides of alcohols, and the like. Two or more of them may be used in combination. Hereinafter, an organic solvent blended with these compounds as a specific gravity adjuster is sometimes referred to as "mixed solvent".

The used amount of the specific gravity adjuster is set as appropriate in accordance with the type of the organic solvent and the like such that a later-described specific gravity difference between a reaction solvent and the monomer composition in a narrow sense in the reaction portion is achieved.

(Dispersing Agent)

In the method for producing the water-absorbent resin according to the present invention, a dispersing agent whose examples will be described below can be added to the above organic solvent or mixed solvent as long as the object of the present invention is achieved. The dispersing agent is not particularly limited, but preferable examples thereof include a surfactant and a polymer protection colloid.

Specific examples of the surfactant include sucrose fatty acid esters, polyglycerin fatty acid esters, sorbitan fatty acid esters, polyoxyethylene sorbitan fatty acid esters, polyoxyethylene glycerin fatty acid esters, sorbitol fatty acid esters, polyoxyethylene sorbitol fatty acid esters, polyoxyethylene alkyl ethers, polyoxyethylene alkyl phenyl ethers, polyoxyethylene castor oil, polyoxyethylene hydrogenated castor oil, alkylallylformaldehyde-condensed polyoxyethylene ethers, polyoxyethylene polyoxypropylene block copolymers, polyoxyethylene polyoxypropyl alkyl ethers, polyethylene glycol fatty acid esters, alkyl glucosides, N-alkyl gluconamides, polyoxyethylene fatty acid amides, polyoxyethylene alkylamines, phosphates of polyoxyethylene alkyl ethers, phosphates of polyoxyethylene alkyl aryl ethers, and the like. Two or more of them may be used in combination.

Specific examples of the polymer protection colloid include maleic anhydride-modified polyethylene, maleic anhydride-modified polypropylene, maleic anhydride-modified ethylene-propylene copolymer, maleic anhydride-modified ethylene-propylene-diene terpolymer (EPDM), maleic anhydride-modified polybutadiene, maleic anhydride-ethylene copolymer, maleic anhydride-propylene copolymer, maleic anhydride-ethylene-propylene copolymer, maleic anhydride-butadiene copolymer, polyethylene, ethylene-propylene copolymer, oxidized polyethylene, oxidized polypropylene, oxidized ethylene-propylene copolymer, ethylene-acrylic acid copolymer, ethyl cellulose, ethyl hydroxyethyl cellulose, and the like. Among them, from the viewpoint of the dispersion stability of the monomer composition, maleic anhydride-modified polyethylene, maleic anhydride-modified polypropylene, maleic anhydride-modified ethylene-propylene copolymer, maleic anhydride-ethylene copolymer, maleic anhydride-propylene copolymer, maleic anhydride-ethylene-propylene copolymer, polyethylene, polypropylene, ethylene-propylene copolymer, oxidized polyethylene, oxidized polypropylene, and oxidized ethylene-propylene copolymer are preferable. Two or more of them may be used in combination. In addition, these polymer protection colloids may be used in combination with the surfactant.

The used amount of the dispersing agent is set as appropriate in accordance with the types of the monomer composition and the organic solvent and the like such that the surface tension of the obtained water-absorbent resin is not influenced. Specifically, the used amount of the dispersing agent is preferably 0 to 0.2% by mass, more preferably 0 to 0.1% by mass, and further preferably 0 to 0.01% by mass, as the concentration of the dispersing agent in the organic solvent. In the method according to the present invention, the dispersing agent may not be used.

In the specification of the present application, an organic solvent that does not contain the above monomer composition and contains the above specific gravity adjuster and/or the above dispersing agent according to need is referred to as organic solvent composition. In addition, a composition that contains this organic solvent composition and the monomer composition and is heated to a temperature equal to or higher than a later-described temperature of the organic solvent composition at the time of mixing is sometimes referred to as reaction composition. An organic solvent composition obtained by removing the monomer composition in a narrow sense from the reaction composition is referred to as reaction solvent.

(W/O Ratio)

The amount of the reaction solvent is set as appropriate in accordance with the shape and the capacity of the reaction device 14 and the like. From the viewpoint of control of the temperature of the organic solvent composition at time of mixing, and control of the particle diameter of the water-absorbent resin, the ratio of the amount W of the monomer composition in a narrow sense and the amount O of the reaction solvent in the reaction composition (hereinafter, referred to as "W/O ratio") is preferably in the range of 1 to 40% by volume. In the case of increasing the W/O ratio within the above range, the used amount of the dispersing agent is preferably increased such that the physical properties of the water-absorbent resin are not influenced. On the other hand, in the case of decreasing the W/O ratio within the above range, the W/O ratio can be selected from among the range in which the used amount of the dispersing agent is not excessively small, in consideration of the relationship with the physical properties of the obtained water-absorbent resin. In each of the first and second embodiments described above as specific embodiments, a more preferable W/O ratio can be selected as described later. Unless otherwise noted, the volume of a liquid is the volume at 25° C. under 1 atm.

W/O Ratio in First Embodiment

The W/O ratio in the first embodiment is more preferably from 5% to 35% by volume, further preferably from 10% to 30% by volume, and particularly preferably from 15% to 25% by volume. In the first embodiment, by adjusting the W/O ratio within the above range, the surface tension of the water-absorbent resin improves, and high productivity is achieved.

W/O Ratio in Second Embodiment

The W/O ratio in the second embodiment is more preferably from 1% to 30% by volume, further preferably from 2% to 20% by volume, and particularly preferably from 3% to 10% by volume. In the second embodiment, by adjusting the W/O ratio within the above range, the surface tension of the water-absorbent resin improves, and high productivity is achieved.

(Temperature of Organic Solvent Composition at Time of Mixing)

In the method for producing by the present invention, the temperature $T_d$ of the organic solvent composition is at least 70° C. at the time of mixing. From the viewpoint of polymerization efficiency and control of the particle diameter of the hydrous gel, the temperature $T_d$ is preferably not lower than 75° C., more preferably not lower than 77° C., and particularly preferably not lower than 80° C. The upper limit of the temperature $T_d$ is not particularly limited from the viewpoint of the advantageous effects of the present invention, but is preferably within a range not exceeding the boiling point of the organic solvent to be used, from the viewpoint of safety. As a specific upper limit, 120° C. is preferable, 110° C. is more preferable, and 100° C. is further preferable.

Furthermore, when the 10-hour half-life temperature $T_{10}$ of the pyrolytic polymerization initiator contained in the monomer composition exceeds 70° C., the temperature $T_d$ of the organic solvent composition is preferably equal to or higher than the 10-hour half-life temperature $T_{10}$ at the time of mixing, from the viewpoint of polymerization efficiency and control of the particle diameter of the hydrous gel. From this viewpoint, the difference $\Delta T_2 (= T_d - T_{10})$ between the temperature Td and the temperature T10 is preferably not lower than 0° C., more preferably not lower than 5° C., further preferably not lower than 7° C., and particularly preferably not lower than 10° C. That is, in the production method according to the present invention, the temperature Td of the organic solvent composition is preferably set at the time of mixing so as to satisfy Td≥2 (T10+ΔT2)≥70° C. (in the formula, ΔT2≥0° C.).

(Temperature of Reaction Solvent)

The temperature of the above reaction solvent is preferably not lower than 70° C. and more preferably not lower than the above temperature T10. In addition, similarly to the upper limit of the temperature Td, the upper limit thereof preferably does not exceed the boiling point of the organic solvent composition. As a specific upper limit, 120° C. is preferable, 110° C. is more preferable, and 100° C. is further preferable.

In mixing the above organic solvent composition and the above monomer composition, if the temperature of the monomer composition is lower than the above temperature Td of the organic solvent composition at the time of mixing, the temperature of the reaction solvent is lower than the temperature Td, and thus the temperature Td is set high in advance in consideration of this temperature fall, and can be controlled to be equal to or higher than the higher temperature of the temperature T10 and 70° C. Particularly, when the adding speed of the monomer composition per unit time to 100 g of the organic solvent composition is not less than 0.5 g/sec, a method for obtaining the temperature Td through calculation in consideration of a temperature change caused by addition of the monomer composition is preferable. Moreover, since a polymerization reaction progresses in a reaction portion described later, control is performed by temperature-keeping, heating, or cooling, so as not to deviate from the above temperature range.

More specifically, in the case of the above-described first embodiment, the above temperature Td of the organic solvent composition at the time of mixing is calculated on the basis of the temperature, the specific heat, and the mass of each of the monomer composition and the organic solvent composition immediately before formation of the reaction composition. In addition, in the case of the second embodiment, the temperature Td is calculated on the basis of the temperature, the specific heat, and the mass flow rate per unit time of each of the monomer composition and the organic solvent composition immediately before formation of the reaction composition.

(Polymerization Ratio)

From the viewpoint of reduction of the residual monomer in the obtained water-absorbent resin, the polymerization ratio is preferably not less than 70% by mass, more preferably not less than 80% by mass, and further preferably not less than 90% by mass. The upper limit of the polymerization ratio is not particularly limited, but 100% by mass is ideal.

In the method according to the present invention, measurement of the polymerization ratio is performed at the time point at which the obtained hydrous gel in particle form is separated from the organic solvent composition and/or the reaction solvent in a separating step described later. For example, when maturing, azeotropic dehydration, surface-crosslinking, and the like are performed, after end of the polymerization step, in a state where the hydrous gel in particle form is not separated from the organic solvent composition and the like, the polymerization ratio is measured at the time point when the hydrous gel in particle form is separated from the organic solvent composition and the like in the subsequent separating step. More preferably, a production condition or the like is set such that, after end of the polymerization step, the polymerization ratio measured before being subjected to other steps other than the separating step is not less than 50% by mass.

(Polymerization Time)

In the method according to the present invention, the start point of the polymerization step is defined as the time point at which the reaction composition is formed, that is, as the time point at which the reaction composition in which the temperature of the reaction solvent is equal to or higher than 70° C. is obtained. For example, when the temperature of the monomer composition containing the organic solvent composition prepared in <Specific Embodiment 2 of Mixing Step> described above is equal to or higher than the above temperature Td of the organic solvent composition at the time of mixing, the time of end of the mixing step is defined as the start point of the polymerization step. In the specification of the present application, the polymerization time means a time in which the temperature of the reaction solvent is kept at a temperature equal to or higher than the higher temperature of the temperature T10 and 70° C. from the start point of the polymerization step.

In the method according to the present invention, the polymerization time is adjusted as appropriate in accordance with the types of the monomer and the polymerization initiator, the shape of the reaction device 14 described later, and the like, and a preferable polymerization time is at least 30 seconds, from the viewpoint of the polymerization speed, the polymerization ratio, and the like.

For example, in the case of an embodiment in which a step subsequent to the polymerization step is the separating step described later, the polymerization time is more preferably a time until a polymerization ratio of not less than 70% by mass is achieved, further preferably a time until a polymerization ratio of not less than 80% by mass is achieved, and particularly preferably a time until a polymerization ratio of not less than 90% by mass is achieved. In this embodiment, when the time until a polymerization ratio of not less than 70% by mass is achieved exceeds 30 seconds, the time until a polymerization ratio of not less than 70% by mass is achieved is regarded as the polymerization time. That is, the shortest polymerization time in this embodiment is the longer time of 30 seconds and the time until a polymerization ratio of not less than 70% by mass is achieved. A specific polymerization time is set in accordance with the reaction conditions, the shape of the reaction device 14, and the like, and, as rough standards, the polymerization time is more preferably not shorter than 60 seconds, further preferably not shorter than 120 seconds, and particularly preferably not shorter than 150 seconds. The upper limit of the polymerization time is not particularly limited, but 20 minutes is one rough standard in terms of production efficiency.

In addition, for example, in the case of an embodiment in which the step subsequent to the polymerization step is not the separating step described later, the polymerization time is more preferably a time until a polymerization ratio of not less than 50% by mass is achieved, further preferably a time until a polymerization ratio of not less than 70% by mass is achieved, even further preferably a time until a polymerization ratio of not less than 80% by mass is achieved, and particularly preferably a time until a polymerization ratio of not less than 90% by mass is achieved. In this embodiment, when the time until a polymerization ratio of not less than 50% by mass is achieved exceeds 30 seconds, the time until a polymerization ratio of not less than 50% by mass is achieved is regarded as the polymerization time. That is, the shortest polymerization time in this embodiment is the longer time of 30 seconds and the time until a polymerization ratio of not less than 50% by mass is achieved. A specific polymerization time is set in accordance with the reaction conditions, the shape of the reaction device 14, and the like, and, as rough standards, the polymerization time is preferably not shorter than 45 seconds, more preferably not shorter than 60 seconds, further preferably not shorter than 120 seconds, and particularly preferably not shorter than 150 seconds. The upper limit of the polymerization time is not particularly limited, but 20 minutes is one rough standard in terms of production efficiency.

In the case of cooling such that the temperature of the hydrous gel and/or the reaction solvent containing the hydrous gel is less than the higher temperature of the above temperature T10 and 70° C., the time point at which the temperature of the hydrous gel and/or the reaction solvent becomes less than this temperature is regarded as the end point of the polymerization time, regardless of the type of the step subsequent to the polymerization step.

(Reaction Pressure)

In the method according to the present invention, a polymerization reaction is preferably carried out under pressure. Basically, the viscosity of a liquid increases under pressure, and thus the viscosity of the reaction solvent increases. Relative movement of the droplets, which are formed with the monomer composition in a narrow sense and dispersed in the reaction solvent whose viscosity has been increased, relative to the reaction solvent around the droplets is restricted. As a result, the droplets formed with the monomer composition are inhibited from becoming unified.

In addition, the polymerization reaction under pressure inhibits occurrence of bubbles and volume expansion, and thus the following phenomenon is thought to be able to be avoided.

1. When bubbles occur in the reaction solvent and adhere to the droplets formed with the monomer composition in a narrow sense, the apparent specific gravities of the droplets decrease. Thus, upward movement of the droplets easily occurs. As a result, the number of the droplets of the monomer composition in a narrow sense increases in an upper region, and unification of the droplets easily occurs.

2. When many bubbles adhere to the droplets formed with the monomer composition in a narrow sense, contact between the droplets and the reaction solvent around the droplets is hindered. Thus, heat transfer from the reaction solvent is less likely to occur, and initiation of polymerization may be delayed.

Furthermore, as effects achieved by the pressurization, an effect of inhibiting the droplets from bursting, due to the temperature of the monomer composition in a narrow sense being rapidly increased, to make the sizes of the droplets ununiform, and an effect of inhibiting a component change caused by evaporation of the organic solvent composition or the like, and the like are expected.

A specific pressure is selected as appropriate in accordance with the purpose. From the viewpoint of cost efficiency and productivity, the pressure is preferably not greater than 10 MPa, more preferably not greater than 5 MPa, further preferably not greater than 1 MPa, and particularly preferably not greater than 0.5 MPa. The lower limit of the pressure is not less than normal pressure.

(Reaction Device)

As the reaction device to be used in this step, a device can be selected as appropriate from devices that can achieve the above reaction conditions. The reaction device to be used in the present invention preferably includes a supply portion, a discharge portion, and a reaction portion.

The supply portion is a portion where the supply device is connected to the reaction portion, but may be the supply device itself. The reaction device may have a supply port as the supply portion. The supply port means a portion through which feed matter outside the reaction portion, such as the monomer composition, the organic solvent, and the like, moves out of contact with the supply device, a pipe, or the like and enters the reaction portion. Specific examples of the supply port include an opening of a pipe, a hole of an orifice plate, and the like. The supply port may contact or may not contact the reaction solvent and the like other than the feed matter.

The reaction portion is a portion in which the monomer composition and the organic solvent composition supplied through the supply port are stored and a polymerization reaction is carried out. The discharge portion is a portion by which the polymerization step and the next step are separated, but does not need to have a structure capable of physical separation, such as a valve.

In the reaction device, a liquid contact surface which comes into contact with the reaction solvent and the like can be selected as appropriate from a resin, a metal, an inorganic compound, and the like on the basis of the reaction conditions from the viewpoint of heat resistance, solvent resistance, strength, and the like. Examples of the resin include: so-called engineering plastic such as polyacetal, polyamide, polycarbonate, polybutylene terephthalate, and ultra high molecular weight polyethylene; and so-called super engineering plastic such as polyacrylate, polyether sulfone, polyether ether ketone, polyimide, polyether imide, and fluororesin; and the like. Examples of the metal include copper, iron, stainless steel, tungsten alloys, and the like. Examples of the inorganic compound include: amorphous bodies such as glass; oxides such as alumina, magnesia, and zirconia; non-oxide ceramics such as silicon carbide, and silicon nitride; and the like.

Example of Preferred Embodiment of Reaction Device in First Embodiment

The reaction device to be used in the first embodiment includes a supply portion, a discharge portion, and a reaction portion. According to need, the reaction device may have a function to adjust the temperature within the reaction portion, or within the supply portion and within the reaction portion. In addition, the reaction device may have a function to stir the reaction solvent and the like within the reaction portion.

A specific embodiment of the reaction portion in the first embodiment is a so-called reaction pot as an example. An example of the discharge portion in this case is a discharge valve provided at a bottom portion of the reaction pot. In addition, in the case where the reaction pot itself is rotatable, a discharge portion including a discharge valve or the like may be provided at an upper portion or a side portion of the reaction pot.

Example of Preferred Embodiment of Reaction Device in Second Embodiment

The reaction device to be used in the second embodiment includes a supply portion, a discharge portion, and one or more reaction portions that connect the supply portion to the discharge portion. According to need, the reaction device may have a function to adjust the temperature within the reaction portions, or within the supply portion and within the reaction portions.

Unless the monomer reactants having different polymerization ratios do not come into contact with each other within the reaction portions, the reaction device may include two or more supply portions for one reaction portion. The reaction device has, as the supply portion, at least one supply port for the monomer composition. According to need, the reaction device may have one or more supply ports for the organic solvent composition. Preferably, the directions of the supply ports are set such that the directions in which the monomer composition and the like are put in through the supply ports are not opposite to the direction in which the organic solvent composition and the like stored in the reaction portions move. For example, in the case where the monomer composition is put to the organic solvent composition that is moving from up to down in the reaction portions, the directions of the supply ports are set preferably to a horizontal or obliquely downward direction, and more preferably to a downward direction.

The discharge portion has at least one discharge port through which the reaction solvent and the hydrous gel in particle form are discharged. The reaction device may have a plurality of discharge ports as the discharge portion. The number of the discharge ports is not particularly limited, but is preferably equal to or less than the number of the supply ports, and is more preferably one regardless of the number of the supply ports. That is, the reaction device for the water-absorbent resin includes the supply portion, the reaction portion and the discharge portion, wherein the supply portion has at least one supply port for the monomer composition and at least one supply port for the organic solvent composition and the discharge portion has at least one discharge port through which the reaction solvent and the hydrous gel in particle form are discharged.

Furthermore, in the reaction device, preferably, the supply portion is connected to the reaction portion, and the reaction portion is connected to the discharge portion. The "connected" means that a state can be achieved in which discharged matter at the upstream side in the reaction device is transferred to the downstream side without being exposed to the outside air. Therefore, not only a mode in which a pipe, a transfer device, and the like are explicitly present but also a mode of direct engagement is included. In addition, the connection between the supply portion and the reaction portion is preferably a mode in which discharged matter from the supply portion can be transferred to the reaction portion without being retained.

Meanwhile, the connection between the reaction portion and the discharge portion may be a mode in which the discharged matter from the supply portion can be continuously transferred to the reaction portion without being retained, or also may be a mode in which intermittent transfer is achieved with a rotary valve, a flash valve which periodically opens and closes, or the like.

The reaction device in the second embodiment may include a plurality of reaction portions. In the reaction device, one reaction portion is connected to at least one supply portion and at least one discharge portion. As long as settings are made such that the monomer reactants having different polymerization ratios do not come into contact with each other, one reaction portion may be branched between the supply portion and the discharge portion, and two or more reaction portions may be connected so as to merge with each other.

The shape of the reaction portion is not particularly limited as long as the object of the present invention is achieved, but a shape that does not include a structure in which the reaction composition that is supplied from the supply portion and formed is retained in the reaction portion and does not move to the discharge portion, is preferably selected. A specific example of the reaction portion having such a shape is a so-called tubular structure. From the viewpoint of scale-up, preferably, the reaction device is a so-called multitubular reactor including a plurality of tubular reaction portions each connected to a supply portion, and the reaction portion has a structure in which a plurality of tubular reaction portions merge with each other before a discharge portion, and are connected to the one discharge portion.

In each tubular reaction portion, control of the temperature of the reaction solvent is easy since the surface area/volume ratio of the reaction portion is high. In addition, since piston flowability of the reaction composition moving within the reaction portion improves, there is an effect that contact between the monomer reactants having different polymerization ratios is inhibited. From this viewpoint, the ratio of the inner diameter D (mm) and the length L (m) of each tubular reaction portion (L/D ratio) is preferably from 2 to 100,000, more preferably from 3 to 50,000, and further preferably from 4 to 20,000. In the second embodiment, the inner diameter of each of the supply portion, the reaction portion, and the discharge portion is preferably larger than the maximum diameter of the hydrous gel formed in the reaction portion.

In the second embodiment, from the viewpoint of inhibiting contact between the monomer reactants having different polymerization ratios, the flow rate of the reaction composition within the reaction portion is preferably higher. In this case, it is necessary to lengthen the reaction portion in proportion to the flow rate, and thus an upper limit is set for the flow rate from the viewpoint of cost efficiency. In addition, the flow rate is preferably increased as the W/O ratio increases.

From the viewpoint of the above, the flow rate of the reaction composition within the reaction portion is preferably 0.01 to 1.0 m/s and more preferably 0.02 to 0.5 m/s. The flow rate less than 0.01 m/s brings that the droplets formed with the monomer composition may become unified, and the dispersibility decreases, therefore that is not preferable. Meanwhile, a pressure loss $\Delta p$ of a fluid is proportional to the product of a flow passage length L and the square root of a flow rate V. In the method for producing by the present invention, the flow passage length L is calculated on the basis of a polymerization time T and the flow rate V. In consideration of L–V×T, the pressure loss $\Delta p$ is proportional to the cube root of the flow rate V. Therefore, The flow rate exceeding 1.0 m/s brings that the size of the reaction device (reaction portion) is increased, and also the pressure loss becomes so great that a very-high-pressure pump is needed, therefore that is not preferable.

A space velocity (LHSV) in the reaction portion can be set as appropriate within the range of the above condition. From the viewpoint of inhibiting contact between the monomer reactants having different polymerization ratios, the space velocity is preferably not less than 2 $hr^{-1}$, more preferably not less than 3 $hr^{-1}$, further preferably not less than 5 $hr^{-1}$, even further preferably not less than 10 $hr^{-1}$, and particularly preferably not less than 15 $hr^{-1}$. The upper limit of the space velocity is determined on the basis of the pressure loss in the reaction portion and the performance of a pump, and is preferably not greater than 120 $hr^{-1}$, more preferably not greater than 90 hr$^{-1}$, further preferably not greater than 60 hr$^{-1}$, and particularly preferably not greater than 30 hr$^{-1}$. In the second embodiment, the space velocity is an index representing a passing speed of the reaction composition in the reaction portion, and is a value (unit: hr$^{-1}$) obtained by dividing the volumetric flow rate of the reaction composition by the capacity of the reaction portion.

In the method according to the present invention, the specific gravity difference between the monomer composition in a narrow sense and the reaction solvent within the reaction portion is preferably adjusted. When the specific gravity difference between the monomer composition in a narrow sense and the reaction solvent increases, the moving direction of the reaction solvent and the moving direction of the droplets formed with the monomer composition in a narrow sense no longer agree with each other, contact between the monomer reactants having different polymerization ratios and occurrence of hydrous gels in particle form having different polymerization times easily occur. Thus, for example, the specific gravity adjuster is blended into the organic solvent composition such that the specific gravity difference is preferably 0.05 to 0.40 and more preferably 0.10 to 0.30.

(STY)

As described above, the STY is the quantity of production per unit reaction volume per unit time. The STY is determined by the amount of the monomer supplied to the polymerization step, the capacity of the reaction device, and the time taken in each step. The STY in the production method according to the present invention is preferably not less than 100 (kg/hr/m$^3$) and more preferably not less than 200 (kg/hr/m$^3$). The upper limit of the STY is not particularly limited, but the sty is preferably not greater than 1000 (kg/hr/m$^3$), from the viewpoint of cost.

Description of Specific Embodiments of Polymerization Step

The following will describe more specific embodiments for the first and second embodiments, but the first and second embodiments are not limited thereto.

Example of Embodiment of Specific Polymerization Step in First Embodiment

A reaction vessel including a temperature adjustment function and stirring means is filled with a predetermined amount of the organic solvent, and a degassing process is performed thereon. Thereafter, the temperature of the organic solvent is adjusted to the predetermined temperature Td of the organic solvent composition at the time of mixing, and the organic solvent is stirred. Separately, the monomer composition is prepared, is adjusted to a predetermined temperature, and then is added to the organic solvent within the reaction vessel by using the supply device. During a predetermined time, the stirring is continued while the temperature of the reaction solvent is kept at a temperature equal to or higher than the higher temperature of the temperature T10 and 70° C. After the predetermined time elapses, the stirring is stopped, and filtration is performed to collect a hydrous gel in particle form.

Example of Embodiment of Specific Polymerization Step in Second Embodiment

A line extending from a preparation tank for preparing a monomer aqueous solution through a liquid feeding device, and a line extending from a preparation tank for preparing a pyrolytic polymerization initiator solution through a liquid feeding device, are connected to one end of the mixing device. A line connected to another end of the mixing device, and a line extending from a preparation tank for preparing an organic solvent composition through a liquid feeding device, are connected to one end of the reaction device. A line connected to another end of the reaction device is connected to the separation device.

In the preparation tank for preparing an organic solvent composition, an organic solvent composition is prepared, then a degassing process is performed, and the temperature of the organic solvent composition is adjusted to a predetermined temperature. The organic solvent composition is supplied to the reaction device by using the liquid feeding device. Separately, a monomer aqueous solution and a pyrolytic polymerization initiator solution that are prepared are mixed in the mixing device to produce a monomer composition. The monomer composition is supplied to the reaction device, and a polymerization reaction is initiated. A hydrous gel formed in the reaction portion is discharged from the other end of the reaction device together with the reaction solvent and supplied to the separation device. In the separation device, the reaction solvent and the hydrous gel are separated from each other, and the hydrous gel in particle form is collected.

(2-4) Separating Step

This step is a step of separating the hydrous gel from a mixture containing the hydrous gel, the reaction solvent, and the like discharged from the reaction device in the polymerization step. The reaction device and the separation device may be connected directly to each other. However, a maturing layer, a partial organic solvent separation device, a step of dehydrating the organic solvent composition through azeotropic distillation or the like, and the like may be present between the reaction device and the separation device. In addition, a rotary valve, a flash valve which periodically opens and closes, or the like may be installed at an outlet of the reaction device or an inlet of the separation device.

In the present invention, the type and the structure of the separation device are not particularly limited, but, for example, publicly known methods such as filtration, sedimentation, centrifugal separation, evaporation, and the like can be used. In addition, an embodiment in which a plurality of types of devices are combined, an embodiment with multiple stages of the same type of devices, or the like can be selected as appropriate.

The hydrous gel separated from the organic solvent composition in the present step is subjected to a necessary step as appropriate. Specifically, the hydrous gel may be directly subjected to a drying step thereby to be made into a water-absorbent resin, and may be further subjected to a pulverization step, a granulation step, a surface-crosslinking step, a sizing step, and the like thereby to be made into a water-absorbent resin.

(Shape of Hydrous Gel)

In the present invention, the shape of the obtained hydrous gel is a spherical shape. The particle diameter of the hydrous gel (hereinafter, referred to as "gel particle diameter") is adjusted as appropriate in accordance with application of the obtained water-absorbent resin and the like.

The "spherical shape" is a concept including shapes (e.g., a substantially spherical shape) other than a perfect spherical shape, and means that the ratio (also referred to as sphericity) of the average long diameter and the average short diameter of the particles is preferably from 1.0 to 3.0. The average long diameter and the average short diameter of the particles are measured on the basis of an image taken by a microscope. In the present invention, the hydrous gel may be formed as an aggregate of micro spherical gels, or may be obtained as a mixture of micro spherical gels and an aggregate of the spherical gels.

In addition, when the hydrous gel is an aggregate of spherical gels, the particle diameter of each spherical gel forming the aggregate is referred to as primary particle diameter. In the present invention, the primary particle diameter is not particularly limited, but from the viewpoint of being able to inhibit occurrence of micro powder in a drying step, the primary particle diameter is preferably 10 to 2000 μm, more preferably 50 to 1000 μm, and further preferably 100 to 800 μm.

(2-5) Drying Step

This step is a step of drying the hydrous gel separated in the above separating step, to a desired solid content rate to obtain a dried polymer in particle form. The hydrous gel may be subjected to the drying step after being adjusted to a desired particle diameter or particle size distribution by crushing or granulating the hydrous gel.

As described above, the shape of the hydrous gel formed by the method according to the present invention is a spherical shape. By drying the spherical hydrous gel, a dried polymer composed of spherical particles is obtained. The dried polymer obtained in this step and composed of spherical particles may be directly used as water-absorbent resin powder. In the method according to the present invention, the dried polymer to be subjected to a surface-crosslinking step described later is referred to as "water-absorbent resin powder" for the sake of convenience.

In the present invention, the method for drying the hydrous gel is not particularly limited, but examples thereof include conductive heat transfer drying, convection heat transfer drying (hot air drying), drying under reduced pressure, infrared drying, microwave drying, drying through azeotropic dehydration with a hydrophobic organic solvent, ventilation drying, stirring drying, high humidity drying using high-temperature water vapor, and the like. Among them, stirring type conductive heat transfer drying, which has high drying efficiency and by which collection of the organic solvent is easy, is preferable.

In the present invention, the drying temperature and the drying time are adjusted as appropriate with the solid content rate of the obtained water-absorbent resin as an index. From the viewpoint of the water absorption performance of the water-absorbent resin, the solid content rate is preferably not less than 85% by mass and more preferably 90 to 98% by mass. The solid content rate of the water-absorbent resin is a value calculated on the basis of a drying loss when a sample (water-absorbent resin) is dried at 180° C. for 3 hours.

(2-6) Organic Solvent Composition Collection Step

This step is a step of making at least a part of the organic solvent composition separated from the polymerization step to end of the drying step, reusable in the mixing step and/or the polymerization step. For carrying out the present invention, this step is not essential. However, this step can be executed if this step is preferable in terms of cost efficiency. The organic solvent composition to be collected does not necessarily have the same composition as the organic solvent composition used in the polymerization step. In addition, it is rather uneconomical to collect the total amount of the organic solvent composition. Thus, it is necessary to add the organic solvent, the specific gravity adjuster, and the dispersing agent as appropriate.

(Specific Collection Mode)

In the above polymerization step and the above drying step, generated vapor of the organic solvent composition is condensed and/or collected, purified according to need, and then reused.

In the above separating step, the residue remaining after the hydrous gel is separated from the mixture containing the hydrous gel, the reaction solvent, and the like is purified according to need, and then reused. The residue includes not only the residue occurring when the hydrous gel is finally separated, but also the residue occurring at each stage in the case where separation is performed at multiple stages.

Furthermore, for executing the above, collection from any one step of the polymerization step to the drying step may be performed, or a combination of collection from some of the steps may be performed. From the viewpoint of cost efficiency, collection from the separating step is preferable in many cases.

(Purification)

The above purification is not limited as long as the purpose of reuse is achieved. Specific examples thereof include filtration, distillation, oil-water separation, chemical treatment, washing with water, and the like, and they can be combined as appropriate and carried out according to need.

<Description of Specific Embodiment of Organic Solvent Composition Collection Step>

The following will describe a specific embodiment with reference to the FIGURE, but the invention of the present application is not limited thereto.

The mixture containing the hydrous gel, the organic solvent composition, and the like which is discharged from the reaction device 14 is transferred through the line 120 to the separation device 16. In the separation device 16, the hydrous gel and the residue are separated and sent to the hydrous gel discharge line 150 and the residue transfer line 130, respectively. The residue sent to the line 130 is sent through the liquid-feeding pump 20 to the purification device 18 and purified therein. After the purification, supply from an organic solvent composition supply line 3 is performed for a shortfall such that a predetermined organic solvent composition is formed, and then the residue is adjusted to a predetermined temperature by the heat exchanger 22. Thereafter, the residue is supplied through the organic solvent composition supply line 140 to at least one of the supply device 12 and the reaction device 14 according to need.

(2-7) Hydrous Gel Production System

In the method for producing the water-absorbent resin of the present invention, the use of a hydrous gel production system is preferable because of the production efficiency.

The hydrous gel production system includes: the above reaction device; the above separation device; a hydrous gel-containing matter transfer line connecting the discharge portion of the reaction device to the separation device; a heat exchanger; a residue transfer line connecting the separation device to the heat exchanger; an organic solvent composition supply line connected to the residue transfer line; a liquid-feeding pump connected on the residue transfer line in between the separation device and a portion to which the organic solvent composition supply line is connected; the above supply device; an organic solvent composition transfer line connecting the heat exchanger to the supply device and/or the supply portion of the reaction device; the above mixing device; a monomer composition transfer line connecting the mixing device to the supply device; a monomer aqueous solution supply line connected to the mixing device; and a polymerization initiator supply line connected to the mixing device.

For stably operating the hydrous gel production system over a long period of time, a purification device is preferably connected to one or more locations on the residue transfer line. The connection position of the purification device is more preferably on the residue transfer line and between the separation device and the portion to which the organic solvent composition supply line is connected.

The FIGURE shows a mode in which the purification device 18 is connected, on the residue transfer line 130, between the liquid-feeding pump 20 and the heat exchanger 22. However, the present invention is not limited to this mode, and the connection positions of the purification device 18 and the liquid-feeding pump 20 may be interchanged, or the purification device 18 may be connected at each of both sides of the liquid-feeding pump 20.

(2-8) Other Steps

In addition to the respective steps described above, the method for producing the water-absorbent resin according to the present invention can include a pulverization step, a classification step, a surface-crosslinking step, a sizing step, a fine powder removal step, a granulation step, and a fine powder reuse step according to need. In addition, the production method may further include a transport step, a storage step, a packing step, a keeping step, and the like.

(Pulverization Step and Classification Step)

The dried polymer in particle form obtained in the above drying step is made into water-absorbent resin powder having a controlled particle diameter or particle size distribution through a pulverization step and a classification step according to need.

In the pulverization step, a high-speed rotary type pulverizer such as a roll mill, a hammer mill, a screw mill, a pin mill, and the like, a vibration mill, a knuckle type pulverizer, a cylindrical mixer, or the like is selected as appropriate and used.

In the classification step, for example, sieve classification with a JIS standard sieve (JIS Z8801-1 (2000)), air-flow classification, or the like is selected as appropriate and used.

The dried polymer obtained through the pulverization step and the classification step and the dried polymer composed of spherical particles may be mixed to be made into water-absorbent resin powder. In this case, the contained amount of the dried polymer, composed of spherical particles, in the water-absorbent resin powder is preferably not less than 80% by mass and more preferably not less than 90% by mass.

(Surface-Crosslinking Step)

The dried polymer in particle form obtained through the drying step, that is, the water-absorbent resin powder, is subjected to a surface-crosslinking step according to need. The surface-crosslinking step is a step of providing a portion having a high crosslinking density to a surface layer of the water-absorbent resin powder (a portion of several tens of micrometers from the surface of the water-absorbent resin powder). In the present invention, a publicly known surface-crosslinking technique is used as appropriate.

(Sizing Step)

In the method for producing the water-absorbent resin according to the present invention, the "sizing step" means a step of breaking the water-absorbent resin powder that loosely aggregates through the surface-crosslinking step, to make the particle diameter thereof uniform. The sizing step includes a fine powder removal step, a hydrous gel crushing step, and a classification step which are subsequent to the surface-crosslinking step.

(Fine Powder Reuse Step)

In the method for producing the water-absorbent resin according to the present invention, the "fine powder reuse step" means a step of supplying fine powder to any step without changing the fine powder or after granulating the fine powder.

[3] Physical Properties of Water-absorbent Resin

In the case where the water-absorbent resin obtained by the method according to the present invention is used for sanitary articles, particularly, for disposable diapers, among physical properties described below in (3-1) to (3-6), at least one, preferably two or more including AAP, more preferably three or more including AAP, and most preferably all the physical properties are desirably controlled within desired ranges. When all of the physical properties described below do not satisfy the ranges described below, the advantageous effects of the present invention are not sufficiently achieved, and sufficient performance may not be exerted particularly in so-called high-concentration disposable diapers in which the amount of the water-absorbent resin used per paper diaper is large.

(3-1) CRC (Centrifuge Retention Capacity)

The CRC (centrifuge retention capacity) of the water-absorbent resin according to the present invention is normally not less than 5 g/g, preferably not less than 15 g/g, and more preferably not less than 25 g/g. The upper limit thereof is not particularly limited, and a higher CRC is preferable. However, from the viewpoint of balance with the other physical properties, the CRC is preferably not greater than 70 g/g, more preferably not greater than 50 g/g, and further preferably not greater than 40 g/g.

When the above CRC is less than 5 g/g, the amount of absorption is small, and the water-absorbent resin is not suitable as an absorbent body for sanitary articles such as disposable diapers. In addition, when the above CRC exceeds 70 g/g, the speed at which body fluids such as urine, blood, and the like are absorbed decreases, and thus the water-absorbent resin is not suitable for use for high water absorption speed-type disposable diapers and the like. The CRC can be controlled by changing the types and the amounts of the internal crosslinking agent, a surface-crosslinking agent, and the like.

(3-2) AAP (Water Absorption Capacity Under Load)

The AAP (water absorption capacity under load) of the water-absorbent resin according to the present invention is preferably not less than 20 g/g, more preferably not less than 22 g/g, further preferably not less than 23 g/g, particularly preferably not less than 24 g/g, and most preferably not less than 25 g/g. The upper limit thereof is not particularly limited, but the AAP is preferably not greater than 30 g/g.

When the above AAP is less than 20 g/g, the amount of liquid return (sometimes referred to as "Re-Wet") when pressure is applied to the absorbent body increases, and thus the water-absorbent resin is not suitable as an absorbent body for sanitary articles such as disposable diapers. The AAP can be controlled by adjustment of the particle size, change of the surface-crosslinking agent, and the like.

(3-3) Ext (Water-Soluble Content)

The Ext (water-soluble content) of the water-absorbent resin according to the present invention is normally not greater than 50% by mass, preferably not greater than 35% by mass, more preferably not greater than 25% by mass, and further preferably not greater than 15% by mass. The lower limit thereof is not particularly limited, but is preferably 0% by mass and more preferably about 0.1% by mass. In the present invention, "about . . ." means that an error of ±5% is included.

When the above Ext exceeds 50% by mass, the water-absorbent resin may have low gel strength and inferior liquid permeability. Furthermore, since the Re-Wet increases, the water-absorbent resin is not suitable as an absorbent body for sanitary articles such as disposable diapers. The Ext can be controlled by changing the types and the amounts of the internal crosslinking agent and the like.

(3-4) Residual Monomer Amount

From the viewpoint of safety, the amount of the residual monomer contained in the water-absorbent resin according to the present invention is preferably not greater than 1000 ppm, more preferably not greater than 500 ppm, and further preferably not greater than 300 ppm. The lower limit thereof is not particularly limited, but is preferably 0 ppm and more preferably about 10 ppm.

By making the residual monomer amount within the above range, a water-absorbent resin having alleviated stimulation to the skin of a human body and the like is obtained.

(3-5) Moisture Content

The moisture content of the water-absorbent resin according to the present invention preferably exceeds 0% by mass and is not greater than 20% by mass, more preferably 1 to 15% by mass, further preferably 2 to 13% by mass, and particularly preferably 2 to 10% by mass.

By making the moisture content within the above range, a water-absorbent resin having excellent powder characteristics (e.g., fluidity, transportability, damage resistance, etc.) is obtained.

(3-6) Particle Size

The weight average particle diameter (D50) of the water-absorbent resin according to the present invention is preferably 200 to 700 µm, more preferably 250 to 600 µm, further preferably 250 to 500 µm, and particularly preferably 300 to 450 µm. In addition, the proportion of the particles having a particle diameter of less than 150 µm is preferably not greater than 20% by mass, more preferably not greater than 10% by mass, and further preferably not greater than 5% by mass. Moreover, the proportion of the particles having a particle diameter of not less than 850 µm is preferably not greater than 20% by mass, more preferably not greater than 15% by mass, and further preferably not greater than 10% by mass. The logarithmic standard deviation (σζ) of the particle size distribution is preferably 0.20 to 0.50, more preferably 0.25 to 0.40, and further preferably 0.27 to 0.35.

[4] Application of Water-Absorbent Resin

Application of the water-absorbent resin according to the present invention is not particularly limited, and preferable examples thereof include application as an absorbent body for sanitary articles such as disposable diapers, sanitary napkins, incontinence pads, and the like. In particular, the water-absorbent resin can be used as an absorbent body for high-concentration disposable diapers for which odor, coloring, and the like derived from the raw material are problems. Furthermore, in the case where the absorbent resin according to the present invention is used in an upper layer of the absorbent body, significant effects can be expected.

In addition, as the raw material of the absorbent body, an absorbent material such as pulp fibers and the like can be used together with the water-absorbent resin. In this case, the amount (core concentration) of the water-absorbent resin contained in the absorbent body is preferably 30 to 100% by mass, more preferably 40 to 100% by mass, further preferably 50 to 100% by mass, even more preferably 60 to 100% by mass, particularly preferably 70 to 100% by mass, and most preferably 75 to 95% by mass.

By making the core concentration within the above range, in the case where the absorbent body is used in an upper layer of an absorbent article, the absorbent article can be kept in a white state providing clean feel. Furthermore, the absorbent body is excellent in diffusion property with respect to body fluids such as urine, blood, and the like, and thus an increase in absorption amount can be expected due to efficient liquid distribution.

EXAMPLES

The following will describe the present invention more specifically by means of Examples and Comparative Examples. However, the present invention is not limited to the description thereof, and an Example obtained by appropriately combining technical means that are disclosed in the respective Examples is also included in the technical scope of the present invention.

Unless specifically noted otherwise, a power source of 200 V or 100 V was used for electric apparatuses (including an apparatus for measuring physical properties of a water-absorbent resin) used in Examples and Comparative Examples. In addition, unless specifically noted otherwise, various physical properties of the water-absorbent resin of the present invention were measured under conditions of room temperature (20 to 25° C.) and a relative humidity of 50% RH±10%.

Furthermore, for the sake of convenience, "liter" is sometimes represented as "l" or "L", and "% by mass" is sometimes represented as "wt %". In measurement of a trace component, the detection limit or less is sometimes represented by N. D (Non Detected).

[Methods for Measuring Physical Properties of Hydrous Gel and Water-Absorbent Resin]

(a) CRC (Centrifuge Retention Capacity)

CRC (centrifuge retention capacity) of a water-absorbent resin was measured according to the EDANA method (ERT441.2-02).

(b) AAP (Water Absorption Capacity Under Load)

AAP (water absorption capacity under load) of a water-absorbent resin was measured according to the EDANA method (ERT442.2-02). Measurement was taken with its load condition changed to 4.83 kPa (0.7 psi).

(c) Ext (Water-Soluble Content)

Ext (water-soluble content) of a water-absorbent resin was measured according to the EDANA method (ERT470.2-02).

(d) Residual Monomer Amount

The residual monomer amount of a water-absorbent resin was measured according to the EDANA method (ERT410.2-02).

(e) Moisture Content

Moisture content of a water-absorbent resin was measured according to the EDANA method (ERT430.2-02). In the present invention, measurement was taken with its sample amount changed to 1.0 g and its drying temperature changed to 180° C.

(f) Particle Size

Particle size (particle size distribution, weight average particle diameter (D50), logarithmic standard deviation (σζ) of the particle size distribution) of a water-absorbent resin was measured according to "(3) Mass-Average Particle Diameter (D50) and Logarithmic Standard Deviation (σζ) of Particle Diameter Distribution" described in Columns 27 and 28 of U.S. Pat. No. 7,638,570.

(g) Polymerization Ratio 1.00 g of a hydrous gel was put into 1000 g of ion-exchanged water, and the mixture was stirred at 300 rpm for 2 hours. Then, the mixture was filtrated to remove insoluble matter. The amount of the monomer extracted in the filtrate obtained by the above operation was measured by using liquid chromatography. When the amount of the monomer was used as a residual monomer amount m (g), a polymerization ratio C (% by mass) was obtained according to the following formula (1).

[Math. 1]

$$C(\% \text{ by weight}) = 100 \times \{1 - m/(\alpha \times M/100)\} \quad \text{Formula (1)}$$

In formula (1), M means a mass (g) of the hydrous gel, and α means a solid content rate (% by mass) of the hydrous gel. The solid content rate is obtained by the following method.

(h) Solid Content Rate 2.00 g of a hydrous gel was put into an aluminum cup having a bottom surface with a diameter of 50 mm, and then the total mass W1 (g) of the sample (the hydrous gel and the aluminum cup) was accurately weighed. Next, the sample was left at rest within an oven whose atmospheric temperature was set to 180° C. After 24 hours elapsed, the sample was taken out of the oven, and the total mass W2 (g) was weighed with precision. When the mass of the hydrous gel subjected to this measurement was denoted by M (g), the solid content rate a of the hydrous gel (% by mass) was obtained according to the following formula (2).

[Math. 2]

$$\alpha(\% \text{ by weight}) = 100 - \{(W1 - W2)/M\} \times 100 \quad \text{Formula (2)}$$

(i) Gel Particle Diameter and Primary Particle Diameter

An image of a hydrous gel was taken with an optical microscope (KH-3000/Hirox Co., Ltd.), and the short diameters and the long diameters of primary particles were measured from the image. The measurement was performed for primary particles, and the average value was used as the primary particle diameter of the hydrous gel.

Similarly, an image of 10 particles of the hydrous gel was taken with the above optical microscope, the short diameter and the long diameter of each hydrous gel particle were measured from the image, and the average value was used as the gel particle diameter of the hydrous gel.

(j) Surface Tension 50 ml of a 0.9% by mass sodium chloride aqueous solution (physiological saline solution) adjusted to 23 to 25° C. was put into a sufficiently washed beaker having a capacity of 100 ml, and the surface tension of the physiological saline solution was measured by using a tensiometer (automatic tensiometer K11/KRUSS GmbH). In this measurement, the surface tension needs to be within a range of 71 to 75 mN/m. When the measured value is out of the range, the measurement has to be carried out again from the beginning.

Subsequently, a sufficiently washed stir bar having a length of 25 mm and made of fluororesin and 0.5 g of a water-absorbent resin were put into a physiological saline solution whose surface tension had been measured, and the physiological saline solution was stirred at 500 rpm for 4 minutes. Thereafter, the stirring was stopped, the water-containing water-absorbent resin was settled, and the surface tension of the supernatant was measured by the same method as described above.

In the measurement of the present invention, a plate method using a platinum plate was adopted. In addition, before each measurement, a platinum plate to be used for the measurement was sufficiently washed, and also washed by heating with a burner.

(k) STY (Space Time Yield)

STY was calculated on the basis of the following formula (3) in the case of batchwise production of the water-absorbent resin, and was calculated on the basis of the following formula (4) in the case of continuous production of the water-absorbent resin.

[Math. 3]

$$STY(kg/hr/m^3) = \text{added amount of monomer composition}(kg) \times \text{concentration of monomer (\% by weight)/whole process time(hr)/capacity of reaction device}(m^3) \quad \text{Formula (3)}$$

In formula (3), the "added amount of monomer composition" is the total mass of the monomer composition supplied to the reaction device, and the "whole process time" is the time from initiation of putting the organic solvent into the reaction device until discharge of the hydrous gel crosslinked polymer and the organic solvent is fully completed and a state is obtained in which the next polymerization reaction can be initiated in the reaction device.

[Math. 4]

$$STY(kg/hr/m^3) = \text{supplied amount of monomer composition}(kg/hr) \times \text{concentration of monomer (\% by weight)/capacity of reaction device}(m^3) \quad \text{Formula (4)}$$

In formula (4), the "supplied amount of monomer composition" is the mass of the monomer composition supplied to the reaction device per unit time.

Example 1

A hydrous gel crosslinked polymer (hydrous gel) (1) was prepared according to the process shown in the FIGURE, and then the obtained hydrous gel (1) was dried so as to obtain spherical water-absorbent resin powder (1).

A static mixer (T3-15, manufactured by Noritake Co., Limited) was used, a needle (inner diameter: 0.21 mm, model: UNS-27G/Unicontrols Co., Ltd.) was used as a supply device, a PFA tube (inner diameter: 4 mm, outer diameter: 6 mm, overall length: 60 m) formed in a helical shape was used as a reaction device, and a solid-liquid separation device using gravity sedimentation was used as a separation device.

As a preparation stage for polymerization reaction, a mixed solvent (specific gravity: 1.18) obtained by mixing n-heptane and hydrofluoroether (trade name: Novec (registered trademark) 7300/Sumitomo 3M Limited) in a mass ratio of 1.0:2.8 was put into the reaction device, the separation device, and a pipe connecting the reaction device to the separation device. Subsequently, the liquid-feeding pump was activated, and circulation was initiated at a flow rate of 240 ml/min. Furthermore, the heat exchanger was activated, and the organic solvent was heated such that the temperature at the time of mixing (hereinafter, referred to as "set temperature") of the organic solvent present in the reaction device and in a region into which the monomer composition was put was 85° C.

Next, acrylic acid, a 48.5% by mass sodium hydroxide aqueous solution and ion-exchanged water were mixed, and polyethylene glycol diacrylate (average degree of polymerization: 9) and trisodium diethylenetriamine pentaacetate were further blended into the mixture so as to prepare a monomer aqueous solution (1). Nitrogen substitution was performed by blowing nitrogen gas into the monomer aqueous solution (1) while the temperature of the solution was kept at 25° C. In addition, separately, sodium persulfate and ion-exchanged water were mixed to prepare a 10% by mass sodium persulfate aqueous solution (1). Nitrogen substitution was performed by blowing nitrogen gas into the sodium persulfate aqueous solution (1).

Subsequently, the monomer aqueous solution (1) and the sodium persulfate aqueous solution (1) obtained by the above operation were individually supplied to the mixing device and mixed therein to prepare a monomer composition (1). A monomer concentration of the monomer composition (1) was 45% by mass, and the neutralization ratio of the monomer composition (1) was 75% by mole. In addition, the polyethylene glycol diacrylate, which is an internal cross-linking agent, was 0.02% by mole with respect to the monomer, trisodium diethylenetriamine pentaacetate, which is a chelating agent, was 100 ppm with respect to the monomer, and sodium persulfate, which is a polymerization initiator, was 0.1 g/mol with respect to the monomer.

Next, the monomer composition (1) prepared in the above mixing step was immediately sent to the supply device, and then it was put into an organic solvent filling the reaction device, at a flow rate of 10 ml/min (11.8 g/min) by using a needle. The monomer composition (1) was put in such that the direction thereof agreed with the direction in which the organic solvent circulated (parallel flow). In addition, the temperature of the monomer composition (1) before being put into the organic solvent was kept at 25° C. The monomer composition (1) put in by using the needle dispersed in the organic solvent in droplet form (droplet diameter: 250 to 300 µm). The ratio of the monomer composition (1) and the organic solvent (W/O ratio) was 4.2% by volume. In the reaction device, a mass per unit time of the monomer in the monomer composition mixed with the organic solvent was 0.022 g/ml/min per unit volume of the organic solvent. In addition, LHSV was 18.9 $hr^{-1}$.

The droplets formed with the monomer composition (1) (hereinafter, referred to merely as "droplets") moved within the reaction device together with the organic solvent, and had reached a position of about 3 m from an inlet of the reaction device after about 10 seconds from the putting-in. The volume average particle diameter of the droplets at this position was 300 to 400 µm. This is thought to be because the droplets collided against each other to become unified. In addition, the temperature of the reaction solvent at this position was 83° C.

Thereafter, with progress of a polymerization reaction, the droplets moved while turning into fine spherical hydrous gels (hereinafter, referred to as "spherical gels"), and had reached a position of about 20 m from the inlet after about 60 seconds from the putting-in. At this position, an aggregate formed by the fine spherical gels adhering to each other was confirmed. Furthermore, a hydrous gel (1) composed of an aggregate of fine spherical gels having a diameter of 2 to 3 mm was confirmed after 90 seconds (at a position of about 30 m from the inlet) from the putting-in.

The hydrous gel (1) obtained by the above series of operations was continuously discharged from the reaction device together with the organic solvent. In Example 1, the polymerization time from initiation of putting the monomer composition (1) into the reaction device until the initial hydrous gel (1) was discharged from the reaction device was 181 seconds. In addition, the temperature of the reaction solvent near the discharge port for the hydrous gel (1) was 85° C., and the STY was 423 kg/hr/$m^3$.

The hydrous gel (1) and the organic solvent discharged from the reaction device were directly and continuously supplied to the separation device. In the separation device, the hydrous gel (1) and the organic solvent were separated by using gravity sedimentation. The organic solvent separated in the separation device was adjusted by the heat exchanger such that the set temperature was 85° C., and then was supplied to the reaction device again.

The monomer composition (1) was continued to put in for 10 minutes to obtain 109 g of the hydrous gel (1). The obtained hydrous gel (1) had a shape obtained by the fine spherical gels adhering and aggregating, and the primary particle diameter of the hydrous gel (1) was 450 µm.

Subsequently, the obtained hydrous gel (1) was dried at 180° C. for 50 minutes, then the obtained dried polymer (1) was classified by using a sieve having an opening size of 4 mm, and the spherical water-absorbent resin powder (1) having passed through the sieve was collected. No dried polymer (1) remained on the sieve having an opening size of 4 mm. Various physical properties of the obtained hydrous gel (1) and water-absorbent resin powder (1) are shown in Table 1.

Comparative Example 1

Comparative water-absorbent resin powder (1) was obtained by performing the same operations as in Example 1, except, in Example 1, the set temperature of the organic solvent was changed from 85° C. to 65° C. In Comparative Example 1, a mass per unit time of the monomer in the monomer composition mixed with the organic solvent was 0.022 g/ml/min per unit volume of the organic solvent. In addition, LHSV was 18.9 $hr^{-1}$.

The primary particle diameter of a comparative hydrous gel (1) discharged from the reaction device was 700 µm. No aggregation of particles of the comparative hydrous gel (1) was observed at the time of the discharge. However, at the time of drying, an unreacted monomer oozed from the comparative hydrous gel (1), and a plurality of particles of the comparative hydrous gel (1) adhered to each other to become unified. A comparative dried polymer (1) obtained after the drying was a rigid aggregate having a size of 5 to 10 cm.

Thereafter, the total amount of the obtained comparative dried polymer (1) was put into a paint shaker (model No. 488, manufactured by Toyo Seiki Seisaku-Sho, Ltd.), and attempt to crush the comparative dried polymer (1) was made, but large lumps remained. After the crushing, the comparative dried polymer (1) was classified by using a sieve having an opening size of 4 mm, and the matter having passed through the sieve was collected, but 85% by mass of the comparative dried polymer (1) remained on the sieve. The comparative dried polymer (1) remaining on the sieve was pulverized with a commercially available bench pulverizer, and was combined with the matter having passed through the sieve having an opening size of 4 mm, to obtain comparative water-absorbent resin powder (1). Various physical properties of the obtained comparative hydrous gel (1) and comparative water-absorbent resin powder (1) are shown in Table 1.

Example 2

A hydrous gel (2) was prepared according to the process shown in the FIGURE, and then the obtained hydrous gel (2) was dried to obtain spherical water-absorbent resin powder (2).

The above-described static mixer was used as a mixing device, a three-port needle (inner diameter: 0.21 mm, model: UN3-27G/Unicontrols Co., Ltd.) was used as a supply device, a PFA tube (inner diameter: 25 mm, overall length: 10 m) disposed vertically was used as a reaction device, and a solid-liquid separation device using gravity sedimentation was used as a separation device.

As a preparation stage for polymerization reaction, n-heptane (specific gravity: 0.76) was put in as an organic solvent to the reaction device, the separation device, and a pipe connecting the reaction device to the separation device. Subsequently, the liquid-feeding pump was activated, and circulation was initiated at a flow rate of 750 ml/min. In addition, the heat exchanger was activated, and the organic solvent was heated with its set temperature being 90° C.

Next, acrylic acid, a 48.5% by mass sodium hydroxide aqueous solution, and ion-exchanged water were mixed, and polyethylene glycol diacrylate (average degree of polymerization: 9) and trisodium diethylenetriamine pentaacetate were further blended into the mixture, to prepare a monomer aqueous solution (2). Nitrogen substitution was performed by blowing nitrogen gas into the monomer aqueous solution (2) while the temperature of the solution was kept at 25° C. In addition, separately, sodium persulfate and ion-exchanged water were mixed to prepare a 10% by mass sodium persulfate aqueous solution (2). Nitrogen substitution was performed by blowing nitrogen gas into the sodium persulfate aqueous solution (2).

Subsequently, the monomer aqueous solution (2) and the sodium persulfate aqueous solution (2) obtained by the above operation were individually supplied to the mixing device and mixed therein to prepare a monomer composition (2). The monomer concentration of the monomer composition (2) was 43% by mass, and the neutralization ratio of the monomer composition (2) was 70% by mole. In addition, the polyethylene glycol diacrylate, which is an internal cross-linking agent, was 0.02% by mole with respect to the monomer, trisodium diethylenetriamine pentaacetate, which is a chelating agent, was 100 ppm with respect to the monomer, and sodium persulfate, which is a polymerization initiator, was 0.1 g/mol with respect to the monomer.

Next, the monomer composition (2) prepared in the above mixing step was immediately sent to the supply device, and then was put into the organic solvent filling the reaction device, at a flow rate of 50 ml/min (59 g/min) by using the needle. The monomer composition (2) was put in such that the direction thereof agreed with the direction in which the organic solvent circulated (parallel flow). In addition, the temperature of the monomer composition (2) before being put into the organic solvent was kept at 25° C. The monomer composition (2) put in by using the needle dispersed in the organic solvent in droplet form (droplet diameter: 200 to 300 µm). The ratio of the monomer composition (2) and the organic solvent (W/O ratio) was 6.7% by volume. In Example 2, the mass per unit time of the monomer in the monomer composition mixed with the organic solvent was 0.034 g/ml/min per unit volume of the organic solvent. In addition, the LHSV was 9.8 hr$^{-1}$.

The droplets formed with the monomer composition (2) turned into fine spherical gels while falling through the reaction device filled with the organic solvent, as the polymerization reaction progressed. These fine spherical gels adhered to each other to form an aggregate while falling. Then, a hydrous gel (2) made of an aggregate of fine spherical gels having a diameter of 1 to 2 cm was confirmed near the discharge port of the reaction device.

The hydrous gel (2) obtained by the above series of operations was continuously discharged from the reaction device together with the organic solvent. In Example 2, the polymerization time from initiation of putting the monomer composition (2) into the reaction device until the initial hydrous gel (2) was discharged from the reaction device was 120 seconds. In addition, the temperature of the organic solvent near the discharge port for the hydrous gel (2) was 92° C., and the STY was 310 kg/hr/m$^3$.

The hydrous gel (2) and the organic solvent discharged from the reaction device were directly and continuously supplied to the separation device. In the separation device, the hydrous gel (2) and the organic solvent were separated by using gravity sedimentation. The organic solvent separated in the separation device was adjusted by the heat exchanger such that the set temperature was 90° C., and then was supplied to the reaction device again.

The monomer composition (2) was continued to put in for 10 minutes to obtain 590 g of the hydrous gel (2). The primary particle diameter of the obtained hydrous gel (2) was 800 µm.

Subsequently, the obtained hydrous gel (2) was dried at 180° C. for 50 minutes, then the obtained dried polymer (2) was classified by using a sieve having an opening size of 4 mm, and the matter having passed through the sieve was collected. On the sieve having an opening size of 4 mm, 2% by mass of the dried polymer (2) remained. The dried polymer (2) remaining on the sieve was pulverized with a commercially available bench pulverizer, and was combined with the matter having passed through the sieve having an opening size of 4 mm, to obtain the water-absorbent resin powder (2). Various physical properties of the obtained hydrous gel (2) and water-absorbent resin powder (2) are shown in Table 1.

Example 3

Spherical water-absorbent resin powder (3) was obtained by performing the same operations as in Example 2, except, in Example 2, the supplied amount of the monomer composition (2) was changed to 60 ml/min (70.8 g/min), the organic solvent was changed to a mixed solvent (specific gravity: 0.9) obtained by mixing n-heptane and hydrofluoroether (trade name: Novec (registered trademark) 7300/Sumitomo 3M Limited) in a mass ratio of 1.0:0.8, and the temperature (set temperature) of the organic solvent was changed to 80° C.

The ratio of the monomer composition (2) and the organic solvent (W/O ratio) was 8.0% by volume. In Example 3, the mass per unit time of the monomer in the monomer composition mixed with the organic solvent was 0.04 g/ml/min per unit volume of the organic solvent. In addition, the LHSV was 9.9 hr$^{-1}$.

In addition, the polymerization time from initiation of putting the monomer composition (2) into the reaction device until an initial hydrous gel (3) was discharged from the reaction device was 150 seconds. Moreover, the obtained hydrous gel (3) had a shape obtained by fine spherical gels adhering and aggregating, and the primary particle diameter of the hydrous gel (3) was 500 µm. Also, the temperature of the organic solvent near the discharge port for the hydrous gel (3) was 83° C., and the STY was 372 kg/hr/m$^3$. Furthermore, when a dried polymer (3) obtained by drying the hydrous gel (3) was classified by using a sieve having an opening size of 4 mm, no dried polymer (3) remained on the sieve. Various physical properties of the obtained hydrous gel (3) and water-absorbent resin powder (3) are shown in Table 1.

Example 4

Spherical water-absorbent resin powder (4) was obtained by performing the same operations as in Example 2, except, in Example 2, the polymerization initiator was changed to 0.05 g/mol (with respect to the monomer) of sodium persulfate and 0.05 g/mol (with respect to the monomer) of 2,2'-azobis(2-methylpropionamidine)dihydrochloride, the supplied amount of a monomer composition (4) was changed to 70 ml/min (82.6 g/min), the mass ratio between n-heptane and hydrofluoroether (trade name: Novec (registered trademark) 7300/Sumitomo 3M Limited) was changed to 1.0:1.5 (specific gravity: 1.05), and the temperature (set temperature) of the organic solvent was changed to 70° C.

The ratio of the monomer composition (4) and the organic solvent (W/O ratio) was 9.3% by volume. In Example 4, the mass per unit time of the monomer in the monomer composition mixed with the organic solvent was 0.047 g/ml/min per unit volume of the organic solvent. In addition, the LHSV was 10.0 hr$^{-1}$.

In addition, the polymerization time from initiation of putting the monomer composition (4) into the reaction device until an initial hydrous gel (4) was discharged from the reaction device was 180 seconds. The obtained hydrous gel (4) had a shape obtained by fine spherical gels adhering and aggregating, and the primary particle diameter of the hydrous gel (4) was 530 μm. Moreover, the temperature of the organic solvent near the discharge port for the hydrous gel (4) was 75° C., and the STY was 434 kg/hr/m$^3$. Furthermore, when a dried polymer (4) obtained by drying the hydrous gel (4) was classified by using a sieve having an opening size of 4 mm, no dried polymer (4) remained on the sieve. Various physical properties of the obtained hydrous gel (4) and water-absorbent resin powder (4) are shown in Table 1.

Comparative Example 2

Comparative water-absorbent resin powder (2) was obtained by performing the same polymerization operation as in Example 2, except, in Example 2, the set temperature of the organic solvent was changed from 90° C. to 60° C.

In Comparative Example 2, droplets formed with the monomer composition (2) turned into spherical gels while falling through the reaction device filled with the organic solvent, as the polymerization reaction progressed. However, since the temperature of the organic solvent at the time of mixing was so low that the progress of the polymerization became slow, and many droplets therefore became unified before turning into spherical gels. As a result, a comparative hydrous gel (2) in non-aggregated form having a primary particle diameter of about 2 to 3 mm was confirmed near the discharge port of the reaction device.

The comparative hydrous gel (2) obtained by the series of operations above was continuously discharged from the reaction device together with the organic solvent. In Comparative Example 2, the polymerization time from initiation of putting the monomer composition (2) into the reaction device until the initial comparative hydrous gel (2) was discharged from the reaction device was 100 seconds. In addition, the temperature of the organic solvent near the discharge port for the comparative hydrous gel (2) was 58° C.

The comparative hydrous gel (2) and the organic solvent discharged from the reaction device were directly and continuously supplied to the separation device. In the separation device, the comparative hydrous gel (2) and the organic solvent were separated by using gravity sedimentation.

In the separation operation, the gravitationally settled comparative hydrous gel (2) had a low polymerization ratio and was very soft. Thus, the comparative hydrous gel (2) deformed during the separation operation. Furthermore, a polymerization reaction further took place within the separation device due to the unreacted monomer oozing out from the comparative hydrous gel (2), and a plurality of particles of the comparative hydrous gel (2) became fused and unified together. As a result, in the middle of the separation operation, it became difficult to continuously discharge the comparative hydrous gel (2) from the separation device. In addition, a part of the comparative hydrous gel (2) discharged from the separation device did not maintain a spherical shape, and had a unified lump shape having a size of 1 to 2 cm.

Subsequently, when the obtained comparative hydrous gel (2) was dried at 180° C. for 50 minutes similarly to Example 2, a comparative dried polymer (2) obtained after the drying was a rigid aggregate having a size of 5 to 10 cm.

Thereafter, the total amount of the comparative dried polymer (1) was put into the paint shaker, and attempt to crush the comparative dried polymer (2) was made, but large lumps remained. After the crushing, the comparative dried polymer (2) was classified by using a sieve having an opening size of 4 mm, and the matter having passed through the sieve was collected, but 90% by mass of the comparative dried polymer (2) remained on the sieve. The comparative dried polymer (2) remaining on the sieve was pulverized with the bench pulverizer, and was combined with the matter having passed through the sieve having an opening size of 4 mm, to obtain the comparative water-absorbent resin powder (2). Various physical properties of the obtained comparative hydrous gel (2) and comparative water-absorbent resin powder (2) are shown in Table 1.

Example 5

500 ml of a mixed solvent (specific gravity: 1.18) obtained by mixing n-heptane and hydrofluoroether (trade name: Novec (registered trademark) 7300/Sumitomo 3M Limited) in a mass ratio of 1.0:2.8 was put as an organic solvent into a four-neck flask (inner diameter: 80 mm, height: 200 mm) having a capacity of 1 L and equipped with a stirrer, a reflux condenser tube, a thermometer, a three-port needle (inner diameter: 0.21 mm, model: UN3-27G/Unicontrols Co., Ltd.), and a nitrogen gas introduction tube. Thereafter, the liquid temperature was increased to 80° C., and at the same time, nitrogen substitution was performed by blowing nitrogen gas for 10 minutes.

Next, acrylic acid, a 48.5% by mass sodium hydroxide aqueous solution, and ion-exchanged water were mixed, and polyethylene glycol diacrylate (average degree of polymerization: 9) and trisodium diethylenetriamine pentaacetate were further blended into the mixture, to prepare a monomer aqueous solution (5). Nitrogen substitution was performed by blowing nitrogen gas into the monomer aqueous solution (5) while the temperature of the solution was kept at 25° C.

In addition, separately, sodium persulfate, 2,2'-azobis(2-methylpropionamidine)dihydrochloride, and ion-exchanged water were mixed to obtain a polymerization initiator aqueous solution (5). Nitrogen substitution was performed by blowing nitrogen gas into the polymerization initiator aqueous solution (5).

Subsequently, the monomer aqueous solution (5) and the polymerization initiator aqueous solution (5) obtained by the above operation were put into a flask having a capacity of 1 L and were mixed therein, to prepare a monomer composition (5). The monomer concentration of the monomer composition (1) was 45% by mass, and the neutralization ratio of the monomer composition (1) was 75% by mole. In addition, the polyethylene glycol diacrylate, which is an internal crosslinking agent, was 0.02% by mole with respect to the monomer, trisodium diethylenetriamine pentaacetate, which is a chelating agent, was 100 ppm with respect to the monomer, and sodium persulfate, which is a polymerization initiator, was 0.05 g/mol with respect to the monomer, and 2,2'-azobis(2-methylpropionamidine)dihydrochloride was 0.05 g/mol with respect to the monomer.

Next, 118 g (100 ml) of the monomer composition (5) prepared in the above mixing step was immediately dripped into the organic solvent within the four-neck flask by using the three-port needle. The organic solvent was stirred during the dripping, and the dripping time of 118 g of the monomer composition (5) was 1 minute. The ratio of the monomer composition (5) and the organic solvent (W/O ratio) was 20.0% by volume. In Example 5, the mass per unit time of the monomer in the monomer composition mixed with the organic solvent was 0.11 g/ml/min per unit volume of the organic solvent.

After the total amount of 118 g of the monomer composition (5) was dripped, polymerization was performed by heating at 80° C. for 15 minutes. Thereafter, all the contents within the four-neck flask were taken out, and suction filtration was performed, to obtain 109 g of a hydrous gel (5). The obtained hydrous gel (5) had a shape obtained by spherical gels aggregating, and the primary particle diameter of the hydrous gel (5) was 2000 μm. The polymerization time from initiation of putting the monomer composition (5) into the reaction device (four-neck flask) until solid-liquid separation, which is the next step, was initiated was 17 minutes. In addition, the whole process time after the organic solvent was put into the reaction device (four-neck flask) until the hydrous gel (5) and the organic solvent were fully discharged was 30 minutes, and the STY was 106 kg/hr/m$^3$.

Subsequently, the obtained hydrous gel (5) was dried at 180° C. for 50 minutes. Then, an obtained dried polymer (5) was classified by using a sieve having an opening size of 4 mm, and the matter having passed through the sieve was collected, but 10% by mass of the dried polymer (5) remained on the sieve. The dried polymer (5) remaining on the sieve was pulverized with the bench pulverizer, and was combined with the matter having passed through the sieve having an opening size of 4 mm, to obtain water-absorbent resin powder (5). Various physical properties of the obtained hydrous gel (5) and water-absorbent resin powder (5) are shown in Table 1.

Comparative Example 3

Comparative water-absorbent resin powder (3) was obtained by performing the same operations as in Example 5, except, in Example 5, the three-port needle was changed to the needle used in Example 1 and the dripping time was changed from 1 minute to 30 minutes. In Comparative Example 3, the mass per unit time of the monomer in the monomer composition (5) mixed with the organic solvent was 0.003 g/ml/min per unit volume of the organic solvent.

In Comparative Example 3, immediately after dripping of a comparative monomer composition (3) was initiated, a comparative hydrous gel (3) having a primary particle diameter of about 1000 μm was formed. However, as the dripping continued, droplets of the comparative monomer composition (3) adhered to the formed comparative hydrous gel (3), the particle diameter of the comparative hydrous gel (3) gradually increased, and further particles of the comparative hydrous gel (3) initiated aggregating to be fused together. The finally obtained comparative hydrous gel (3) was a large unified lump having a maximum diameter of about 10 cm. The polymerization time was 46 minutes, the whole process time was 59 minutes, and the STY was 54 kg/hr/m$^3$.

Subsequently, the obtained comparative hydrous gel (3) was dried at 180° C. for 50 minutes similarly to Example 5. Then, the total amount of an obtained comparative dried polymer (3) was put into the paint shaker, and attempt to crush the comparative dried polymer (3) was made, but large lumps remained. The crushed comparative dried polymer (3) was classified by using a sieve having an opening size of 4 mm, and the matter having passed through the sieve was collected, but 92% by mass of the comparative dried polymer (3) remained on the sieve. The comparative dried polymer (3) remaining on the sieve was pulverized with the bench pulverizer, and was combined with the matter having passed through the sieve having an opening size of 4 mm, to obtain comparative water-absorbent resin powder (3). Various physical properties of the obtained comparative hydrous gel (3) and comparative water-absorbent resin powder (3) are shown in Table 1.

Comparative Example 4

A comparative hydrous gel (4) and comparative water-absorbent resin powder (4) were prepared according to Example 1 in JP61-192703.

That is, 500 g (642 ml) of cyclohexane and 6.0 g of polyoxyethylene (ethylene oxide average 4 mol adduct) sorbitol tetrastearate having an HLB of 2.4 were put into a four-neck flask having a capacity of 1 L and equipped with a stirrer, a reflux condenser, a needle, and a nitrogen gas introduction tube. Then, nitrogen substitution was performed by blowing nitrogen gas for 20 minutes, and the temperature was increased to 70° C.

100 g (1.39 mol) of acrylic acid was put into another flask, and then 207 g (1.08 mol) of a 20.8% by mass sodium hydroxide aqueous solution was dripped thereinto while the flask was cooled from the outside, to obtain a sodium acrylate aqueous solution having a neutralization ratio of 78% by mole. Thereafter, 0.2 g of ammonium persulfate as a radical polymerization initiator and 0.1 g of ethylene glycol diglycidyl ether as an internal crosslinking agent were added and dissolved therein to prepare a comparative monomer composition (4). Nitrogen substitution was performed by blowing nitrogen gas into the comparative monomer composition (4) while the liquid temperature thereof was kept at 20° C. The monomer concentration of the comparative monomer composition (4) was 40% by mass.

307.3 g (260 ml) of the comparative monomer composition (4) prepared in the above mixing step was dripped into the organic solvent within the four-neck flask over 2 hours by using the needle. The organic solvent was stirred during the dripping, and the ratio of the comparative monomer composition (4) and the organic solvent (W/O ratio) was 42.3% by volume. In Comparative Example 4, the mass per unit time of the monomer in the monomer composition mixed with the organic solvent was 0.0016 g/ml/min per unit volume of the organic solvent.

After the total amount of the comparative monomer composition (4) was dripped, heating was performed at 70° C. for 2 hours to obtain a comparative hydrous gel (4). The primary particle diameter of the obtained comparative hydrous gel (4) was 140 μm, and no aggregation was observed. The polymerization time was 241 minutes, the whole process time was 264 minutes, and the STY was 29 kg/hr/m$^3$.

Subsequently, the comparative hydrous gel (4) was dried at 120° C. for 50 minutes. Then, an obtained comparative dried polymer (4) was classified by using a sieve having an opening size of 4 mm, and the comparative water-absorbent resin powder (4) having passed through the sieve was collected. No comparative dried polymer (4) remained on the sieve having an opening size of 4 mm. Various physical properties of the obtained comparative hydrous gel (4) and comparative water-absorbent resin powder (4) are shown in Table 1.

Example 6

A surface-crosslinking agent solution containing 0.015 parts by mass of ethylene glycol diglycidyl ether, 1.0 part by mass of propylene glycol, and 3.0 parts by mass of ion-exchanged water was sprayed to 100 parts by mass of the water-absorbent resin powder (1) obtained in Example 1, and the mixture was uniformly mixed by using a high-speed continuous mixer.

Next, the obtained mixture was introduced to a heat treatment machine whose atmospheric temperature was adjusted to 195° C.±2° C., and heat treatment was performed for 40 minutes. Then, the powder temperature was forcibly cooled to 60° C., to obtain surface-crosslinked water-absorbent resin powder (6). Hereinafter, surface-crosslinked water-absorbent resin powder is referred to as "water-absorbent resin particles".

The water-absorbent resin particles (6) were sized by being passed through a JIS standard sieve having an opening size of 1000 μm, to obtain a water-absorbent resin (6) as a manufactured product. Various physical properties of the obtained water-absorbent resin (6) are shown in Table 2.

Comparative Example 5

A comparative water-absorbent resin (5) was obtained by performing the same operations as in Example 6, except, in Example 6, the water-absorbent resin powder (1) was changed to the comparative water-absorbent resin powder (1). Various physical properties of the obtained comparative water-absorbent resin (5) are shown in Table 2.

Example 7

A water-absorbent resin (7) was obtained by performing the same operations as in Example 6, except, in Example 6, the water-absorbent resin powder (1) was changed to the water-absorbent resin powder (3). Various physical properties of the obtained water-absorbent resin (7) are shown in Table 2.

Comparative Example 6

Comparative water-absorbent resin powder (6) was prepared according to Example 1 in JP2012-41419.

That is, 340 g of n-heptane, 0.46 g of sucrose stearate having an HLB of 3 (trade name: RYOTO Sugar Ester S-370/Mitsubishi-Kagaku Foods Corporation) which is a surfactant, and 0.46 g of a maleic anhydride-modified ethylene-propylene copolymer (trade name: Hi-WAX 1105A/Mitsui Chemicals, Inc.) which is a polymer protection colloid were put into a round-bottom cylindrical separable flask having a capacity of 2 L and equipped with a stirrer, a two-stage paddle blade, a reflux condenser, a dropping funnel, and a nitrogen gas introduction tube. While the mixture liquid was stirred, the temperature thereof was increased to 80° C. to dissolve the surfactant and the polymer protection colloid. Thereafter, the liquid temperature was cooled to 50° C.

46 g (0.51 mol) of a 80% by mass acrylic acid aqueous solution was put into an Erlenmeyer flask having a capacity of 300 mL. Then, 73.0 g (0.38 mol) of a 21% by mass sodium hydroxide aqueous solution was dripped thereinto while the Erlenmeyer flask was cooled from the outside, to obtain a sodium acrylate aqueous solution having a neutralization ratio of 75% by mole. Thereafter, 0.055 g (0.20 mmol) of potassium persulfate as a radical polymerization initiator and 0.0046 g (0.03 mmol) of N,N'-methylenebisacrylamide as an internal crosslinking agent were added and dissolved therein to prepare a first-stage comparative monomer composition (6).

Next, the total amount of the first-stage comparative monomer composition (6) obtained by the above operation was put into the round-bottom cylindrical separable flask. Then, the comparative monomer composition (6) was dispersed in the mixed solvent by stirring, and the inside of the system was sufficiently substituted with nitrogen. Thereafter, the flask was immersed in a water bath at 70° C. to increase the temperature thereby to carry out a first-stage polymerization reaction, to obtain a first-stage comparative hydrous gel (6). The first-stage polymerization time was 51 minutes.

Subsequently, 46 g (0.51 mol) of a 80% by mass acrylic acid aqueous solution was put into an Erlenmeyer flask having a capacity of 300 ml which is different from the above flask. Then, 56.6 g (0.38 mol) of a 27% by mass sodium hydroxide aqueous solution was dripped while the Erlenmeyer flask was cooled from the outside, to obtain a sodium acrylate aqueous solution having a neutralization ratio of 75% by mole. Thereafter, 0.055 g (0.20 mmol) of potassium persulfate as a radical polymerization initiator and 0.0046 g (0.03 mmol) of N,N'-methylenebisacrylamide as an internal crosslinking agent were added and dissolved therein to prepare a second-stage comparative monomer composition (6).

After the end of the first-stage polymerization, in order to keep a state in which the surfactant and the polymer protection colloid were dissolved, while the temperature within the system was controlled to 40 to 60° C., the total amount of the second-stage comparative monomer composition (6) was put into the round-bottom cylindrical separable flask, and then the inside of the system was sufficiently substituted with nitrogen. Thereafter, the flask was immersed in the water bath at 70° C. to increase the temperature thereby to carry out a second-stage polymerization reaction, to obtain a second-stage comparative hydrous gel (6). The second-stage polymerization time was also 51 minutes.

Furthermore, 128.8 g (1.43 mol) of a 80% by mass acrylic acid aqueous solution was put into an Erlenmeyer flask having a capacity of 500 ml which is different from the above flasks. Then, 159.0 g (1.07 mol) of a 27% by mass sodium hydroxide aqueous solution was dripped while the Erlenmeyer flask was cooled from the outside, to obtain a sodium acrylate aqueous solution having a neutralization ratio of 75% by mole. Thereafter, 0.16 g (0.59 mmol) of potassium persulfate as a radical polymerization initiator and 0.0129 g (0.08 mmol) of N,N'-methylenebisacrylamide as an internal crosslinking agent were added and dissolved therein to prepare a third-stage comparative monomer composition (6).

After the end of the second-stage polymerization reaction, the temperature within the system was cooled to 26° C. Subsequently, the third-stage comparative monomer composition (6) adjusted to 26° C. was put into the round-bottom cylindrical separable flask. For 30 minutes, the second-stage comparative hydrous gel (6) was caused to absorb the comparative monomer composition (6), and the inside of the system was sufficiently substituted with nitrogen at the same time. Thereafter, the flask was immersed in the water bath at 70° C. to increase the temperature thereby to carry out a third-stage polymerization reaction, to obtain a third-stage comparative hydrous gel (6). The third-stage polymerization time was 76 minutes. The ratio of the comparative monomer composition (6) and the organic solvent (W/O ratio) was 96.6% by volume. The obtained comparative hydrous gel (6) had a shape obtained by spherical gels aggregating, and the primary particle diameter of the comparative hydrous gel (6) was 100 μm. In addition, the whole process time was 229 minutes, and the STY was 29 kg/hr/m$^3$.

Subsequently, the round-bottom cylindrical separable flask was immersed in an oil bath at 125° C. to increase the temperature within the system. By this operation, because of azeotropic distillation of n-heptane and water, 224 g of water was discharged out of the system while refluxing n-heptane. Through the series of operations, comparative water-absorbent resin powder (6) was obtained.

Subsequently, 8.17 g (0.94 mmol) of a 2% by mass ethylene glycol diglycidyl ether aqueous solution was added into the round-bottom cylindrical separable flask, and then a cross-linking reaction was carried out at 80° C. for 2 hours. Thereafter, the temperature of the reaction mixture was increased by the oil bath at 125° C. to evaporate n-heptane to dry the reaction mixture, thereby obtaining 228.5 g of a comparative water-absorbent resin (6). Various physical properties of the obtained comparative hydrous gel (6) and comparative water-absorbent resin powder (6) are shown in Table 1, and various physical properties of the comparative water-absorbent resin (6) are shown in Table 2.

Example 8

A hydrous gel (8) and spherical water-absorbent resin powder (8) were obtained by performing the same operations as in Example 2, except, in Example 2, polyethylene glycol diacrylate (average degree of polymerization: 9) was changed to N,N-methylenebisacrylamide, and a sucrose fatty acid ester (trade name: DK Ester F-50/DKS Co. Ltd.) was added as a dispersing agent to n-heptane. The concentration of the sucrose fatty acid ester in n-heptane was 0.003% by mass. In Example 8, the mass per unit time of the monomer in the monomer composition mixed with the organic solvent was 0.034 g/ml/min per unit volume of the organic solvent.

The obtained hydrous gel (8) had a shape obtained by fine spherical gels adhering and aggregating, and the primary particle diameter of the hydrous gel (8) was 300 μm. Furthermore, when a dried polymer (8) obtained by drying the hydrous gel (8) was classified by using a sieve having an opening size of 4 mm, no dried polymer (8) remained on the sieve. Various physical properties of the obtained hydrous gel (8) and water-absorbent resin powder (8) are shown in Table 1.

Example 9

A hydrous gel (9) and spherical water-absorbent resin powder (9) were obtained by performing the same operations as in Example 8, except, in Example 8, the concentration of the sucrose fatty acid ester in n-heptane was changed from 0.003% by mass to 0.03% by mass. In Example 9, the mass per unit time of the monomer in the monomer composition mixed with the organic solvent was 0.034 g/ml/min per unit volume of the organic solvent.

The obtained hydrous gel (9) had a shape obtained by fine spherical gels slightly adhering and aggregating, and the primary particle diameter of the hydrous gel (9) was 240 μm. Furthermore, when a dried polymer (9) obtained by drying the hydrous gel (9) was classified by using a sieve having an opening size of 4 mm, no dried polymer (9) remained on the sieve. Various physical properties of the obtained hydrous gel (9) and water-absorbent resin powder (9) are shown in Table 1.

Example 10

A hydrous gel (10) and spherical water-absorbent resin powder (10) were obtained by performing the same operations as in Example 8, except, in Example 8, the concentration of the sucrose fatty acid ester in n-heptane was changed from 0.003% by mass to 0.1% by mass. In Example 10, the mass per unit time of the monomer in the monomer composition mixed with the organic solvent was 0.034 g/ml/min per unit volume of the organic solvent.

The obtained hydrous gel (10) had a shape obtained by fine spherical gels slightly adhering and aggregating, and the primary particle diameter of the hydrous gel (10) was 190 μm. Furthermore, when a dried polymer (10) obtained by drying the hydrous gel (10) was classified by using a sieve having an opening size of 4 mm, no dried polymer (10) remained on the sieve. Various physical properties of the obtained hydrous gel (10) and water-absorbent resin powder (10) are shown in Table 1.

Example 11

A hydrous gel (11) and spherical water-absorbent resin powder (11) were obtained by performing the same operations as in Example 1, except, in Example 1, polyethylene glycol diacrylate (average degree of polymerization: 9) was changed to N,N-methylenebisacrylamide, 0.03% by mass of a sucrose fatty acid ester (trade name: DK Ester F-50/DKS Co. Ltd.) was added as a dispersing agent to the mixed solvent, and the supplied amount of the monomer composition (1) was changed 22.5 ml/min (26.6 g/min). In Example 11, the mass per unit time of the monomer in the monomer composition mixed with the organic solvent was 0.050 g/ml/min per unit volume of the organic solvent. In addition, the LHSV was 20.9 hr$^{-1}$. Various physical properties of the obtained hydrous gel (11) and water-absorbent resin powder (11) are shown in Table 1.

Example 12

A hydrous gel (12) and spherical water-absorbent resin powder (12) were obtained by performing the same operations as in Example 5, except, in Example 5, the three-port needle was changed to a two-port needle (inner diameter: 0.21 mm, model: UN2-27G/Unicontrols Co., Ltd.) and the dripped amount of the monomer composition (5) was changed from 118 g (100 ml) to 79 g (67 ml). In Example 12, the mass per unit time of the monomer in the monomer composition mixed with the organic solvent was 0.071 g/ml/min per unit volume of the organic solvent. In addition, the STY was 71 kg/hr/m$^3$. Various physical properties of the obtained hydrous gel (12) and water-absorbent resin powder (12) are shown in Table 1.

Example 13 to Example 15

Water-absorbent resins (13) to (15) were obtained by performing the same operations as in Example 6, except, in Example 6, the water-absorbent resin powder (1) was changed to the water-absorbent resin powders (8) to (10). Various physical properties of the obtained water-absorbent resins (13) to (15) are shown in Table 2.

TABLE 1

| | Results or Evaluation | | | | | | | |
|---|---|---|---|---|---|---|---|---|
| | | Hydrous gel | | Dried polymer | Water-absorbent resin powder | | | |
| | | Primary | | | | | | |
| | Productivity STY [kg/hr/m$^3$] | particle diameter [μm] | Polymerization ratio [% by mole] | 4 mm On amount [wt %] | CRC [g/g] | Ext [wt %] | Residual monomer [ppm] | 150 μm pass [wt %] |
| Example 1 | 423 | 450 | 92 | 0 | 45 | 14 | 220 | 5 |
| Comparative Example 1 | 423 | 700 | 50 | 85 | 42 | 14 | 1500 | 12 |
| Example 2 | 310 | 800 | 80 | 2 | 44 | 15 | 420 | 2 |
| Example 3 | 372 | 500 | 85 | 0 | 48 | 16 | 310 | 3 |
| Example 4 | 434 | 530 | 82 | 0 | 47 | 15 | 370 | 3 |
| Comparative Example 2 | 310 | 1 to 2 cm lump | 37 | 90 | 40 | 20 | 5500 | 13 |
| Example 5 | 106 | 2000 | 95 | 10 | 44 | 16 | 200 | 2 |
| Comparative Example 3 | 54 | 10 cm lump | 98 | 92 | 43 | 17 | 180 | 15 |
| Comparative Example 4 | 29 | 140 | 99 | 0 | 44 | 20 | 90 | 74 |
| Comparative Example 6 | 29 | 100 | 98 | 0 | 45 | 21 | 50 | 2 |
| Example 8 | 310 | 300 | 83 | 0 | 46 | 15 | 450 | 6 |
| Example 9 | 310 | 240 | 84 | 0 | 48 | 17 | 490 | 7 |
| Example 10 | 310 | 190 | 82 | 0 | 48 | 19 | 510 | 9 |
| Example 11 | 951 | 290 | 93 | 0 | 44 | 16 | 240 | 6 |
| Example 12 | 100 | 1600 | 94 | 7 | 45 | 16 | 230 | 2 |

"4 mm On amount after drying" shown in Table 1 is the amount (% by mass) of the dried polymer remaining on a sieve having an opening size of 4 mm, and "150 μm pass" is the amount (% by mass) of the water-absorbent resin powder having passed through a sieve having an opening size of 150 μm.

TABLE 2

Results of Evaluation

| | Water-absorbent resin | | |
| --- | --- | --- | --- |
| | CRC [g/g] | AAP [g/g] | Surface tension [mN/m] |
| Example 6 | 33 | 24 | 72 |
| Comparative Example 5 | 31 | 21 | 72 |
| Example 7 | 35 | 26 | 72 |
| Comparative Example 6 | 33 | 15 | 54 |
| Example 13 | 32 | 25 | 71 |
| Example 14 | 33 | 25 | 70 |
| Example 15 | 33 | 23 | 68 |

As shown in Table 1, according to the methods of Examples 1 to 5 and 8 to 12, the amount of bulky particles after drying (4 mm On amount) is small, so that the pulverization step can be simplified, and water-absorbent resin powder having less fine powder (150 µm pass) can be efficiently prepared in a short time.

In addition, as shown in Table 2, the water-absorbent resins (Examples 6, 7, and 13 to 15) produced by surface-crosslinking the water-absorbent resin powder obtained by the method according to the present invention did not decrease the surface tension and were excellent in water absorption performance under load, as compared to the water-absorbent resin (Comparative Example 6) obtained by conventional reverse phase suspension polymerization.

Meanwhile, regarding the Comparative Examples, in Comparative Examples 1 and 2 in which the temperature of the organic solvent in the polymerization step was less than 70° C., the polymerization ratio was low, and the hydrous gel having a large particle diameter was formed. In addition, when the obtained hydrous gel was dried, the hydrous gel became unified into a lump, so that large-scale pulverization operation was needed. Furthermore, in the pulverized water-absorbent resin powder, the amount of fine powder was large, and the amount of the residual monomer was also large.

The water-absorbent resin (Comparative Example 5) prepared by surface-crosslinking the water-absorbent resin powder obtained by the method of Comparative Example 1 had low performance under load.

In addition, in Comparative Examples 3 and 4 in which the mass per unit time of the monomer in the monomer composition mixed with the organic solvent was less than 0.01 g/ml/min per unit volume of the organic solvent, the production efficiency (STY) considerably decreased. In Comparative Example 3, furthermore, aggregation/unification of droplets or particles occurred during polymerization, so that the obtained hydrous gel became a large lump (10 cm), and pulverization operation was needed. Moreover, in Comparative Example 4 in which a large amount of the dispersing agent was used for preventing aggregation of droplets or particles, water-absorbent resin powder was obtained in which the amount of fine powder having a particle diameter of not greater than 150 µm was 74% by mass and thus large.

INDUSTRIAL APPLICABILITY

With the method for producing the water-absorbent resin according to the present invention, the water-absorbent resin can be efficiently prepared in a short time. In addition, the water-absorbent resin obtained by the present invention is suitable for application as an absorbent body for sanitary articles such as disposable diapers.

DESCRIPTION OF THE REFERENCE CHARACTERS

1 . . . monomer aqueous solution supply line
2 . . . polymerization initiator supply line
3 . . . organic solvent composition supply line
10 . . . mixing device
12 . . . supply device
14 . . . reaction device
16 . . . separation device
18 . . . purification device
20 . . . liquid-feeding pump
22 . . . heat exchanger
110 . . . monomer composition transfer line
120 . . . hydrous gel-containing matter transfer line
130 . . . residue transfer line
140 . . . organic solvent composition transfer line
150 . . . hydrous gel discharge line

The invention claimed is:

1. A method for producing a water-absorbent resin comprising mixing a monomer composition, which contains at least a monomer and a pyrolytic polymerization initiator, with an organic solvent,
    wherein a temperature of the organic solvent is not lower than 70° C. at time of mixing,
    wherein, a mass per unit time of the monomer in the monomer composition that is mixed with the organic solvent per unit time is expressed as an amount per unit volume of the organic solvent, a lower limit is 0.02 g/ml/min and an upper limit is 0.2 g/ml/min, and
    wherein a flow rate of a reaction composition within a reaction portion of a reaction device is 0.01 to 1.0 m/s, wherein said reaction composition is obtained by supplying said monomer composition to said organic solvent that is stored in said reaction portion of said reaction device.

2. The method according to claim 1, wherein the monomer composition is mixed dropwise with the organic solvent, and a dripping time is within 180 seconds.

3. The method according to claim 1,
    wherein the monomer composition is supplied continuously to mix with the organic solvent stored in the reaction portion of the reaction device, and a temperature of a reaction composition obtained after mixing is not lower than 70° C., and
    wherein a lower limit of a ratio that is a monomer flow rate/an organic solvent flow rate, which is expressed as a ratio of the monomer flow rate (a monomer composition flow rate (mass/time)×monomer concentration (% by mass)) per the organic solvent flow rate in the reaction portion (volume/time), is 0.02 g/ml, and an upper limit is 0.2 g/ml.

4. The method according to claim 3, wherein a space velocity (LHSV) of the reaction portion is 2 to 120 hr$^{-1}$.

5. The method according to claim 1, wherein a dispersing agent is not added to the organic solvent, or when the dispersing agent is added to the organic solvent, a concentration of the dispersing agent is not greater than 0.2% by mass.

6. The method according to claim 1, wherein the monomer composition before mixed with the organic solvent is kept at a temperature that is lower than a 10-hour half-life temperature of the pyrolytic polymerization initiator contained in the monomer composition and that does not exceed 70° C.

* * * * *